(12) United States Patent
Kobayashi

(10) Patent No.: US 8,488,681 B2
(45) Date of Patent: Jul. 16, 2013

(54) IMAGE CAPTURING APPARATUS, CONTROL METHOD THEREFOR, PROGRAM, AND STORAGE MEDIUM

(75) Inventor: Satoru Kobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1602 days.

(21) Appl. No.: 11/503,065

(22) Filed: Aug. 14, 2006

(65) Prior Publication Data

US 2007/0040917 A1    Feb. 22, 2007

(30) Foreign Application Priority Data

Aug. 17, 2005    (JP) .................................. 2005-236733
Jun. 27, 2006    (JP) .................................. 2006-177293

(51) Int. Cl.
  *H04N 7/12*    (2006.01)
  *H04N 11/02*    (2006.01)
  *H04N 11/04*    (2006.01)

(52) U.S. Cl.
  USPC ............ 375/240.23; 375/240.02; 375/240.03; 375/240.22; 348/404.1; 348/424.2; 348/27; 382/232; 382/239; 382/248; 382/251; 382/253

(58) Field of Classification Search
  USPC ... 375/240.08, 225, 240.01–240.29; 382/173, 382/248, 232, 239, 251, 253; 348/222.1, 348/27, 404.1, 424.2
  See application file for complete search history.

(56) References Cited

U.S. PATENT DOCUMENTS

| | | | |
|---|---|---|---|
| 5,377,312 A | 12/1994 | Kobayashi | 395/116 |
| 5,832,129 A * | 11/1998 | Horiuchi et al. | 382/248 |
| 6,195,458 B1 * | 2/2001 | Warnick et al. | 382/173 |
| 6,434,197 B1 * | 8/2002 | Wang et al. | 375/240.29 |
| 2002/0109780 A1 | 8/2002 | Kaku | 348/231.99 |
| 2004/0008772 A1* | 1/2004 | Kojima | 375/240.08 |
| 2005/0105604 A1* | 5/2005 | Ito et al. | 375/225 |

FOREIGN PATENT DOCUMENTS

| | | |
|---|---|---|
| JP | 09-186919 | 7/1997 |
| JP | 2002-247517 | 8/2002 |
| JP | 2002-369142 | 12/2002 |

* cited by examiner

*Primary Examiner* — Sath V Perungavoor
*Assistant Examiner* — Nathnael Aynalem
(74) *Attorney, Agent, or Firm* — Fitzpatrick, Cella, Harper & Scinto

(57) ABSTRACT

This invention makes it possible to reduce power consumption of an encoding device while more appropriately encoding a video image in the first frame. An image capturing apparatus includes a camera unit which photo-electrically converts object light and outputs a video signal, an encoding unit which encodes the video signal, a camera information acquisition unit which acquires information associated with the operation status of the camera unit, and a calculation unit which calculates, on the basis of the information acquired by the camera information acquisition unit, an initial parameter serving as an encoding parameter for an initial encoding operation of the encoding unit before the start of an encoding operation of the encoding unit.

23 Claims, 16 Drawing Sheets

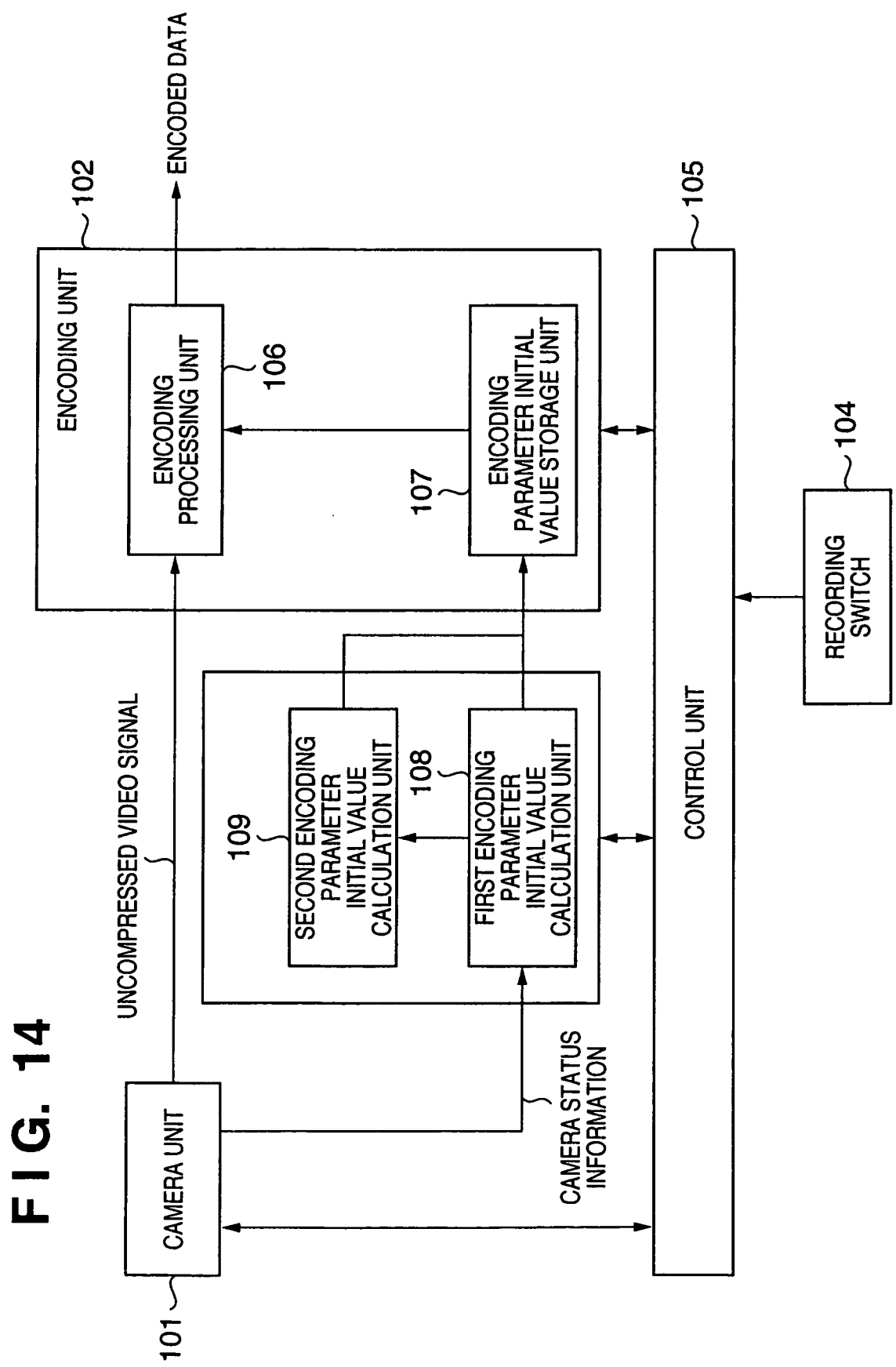

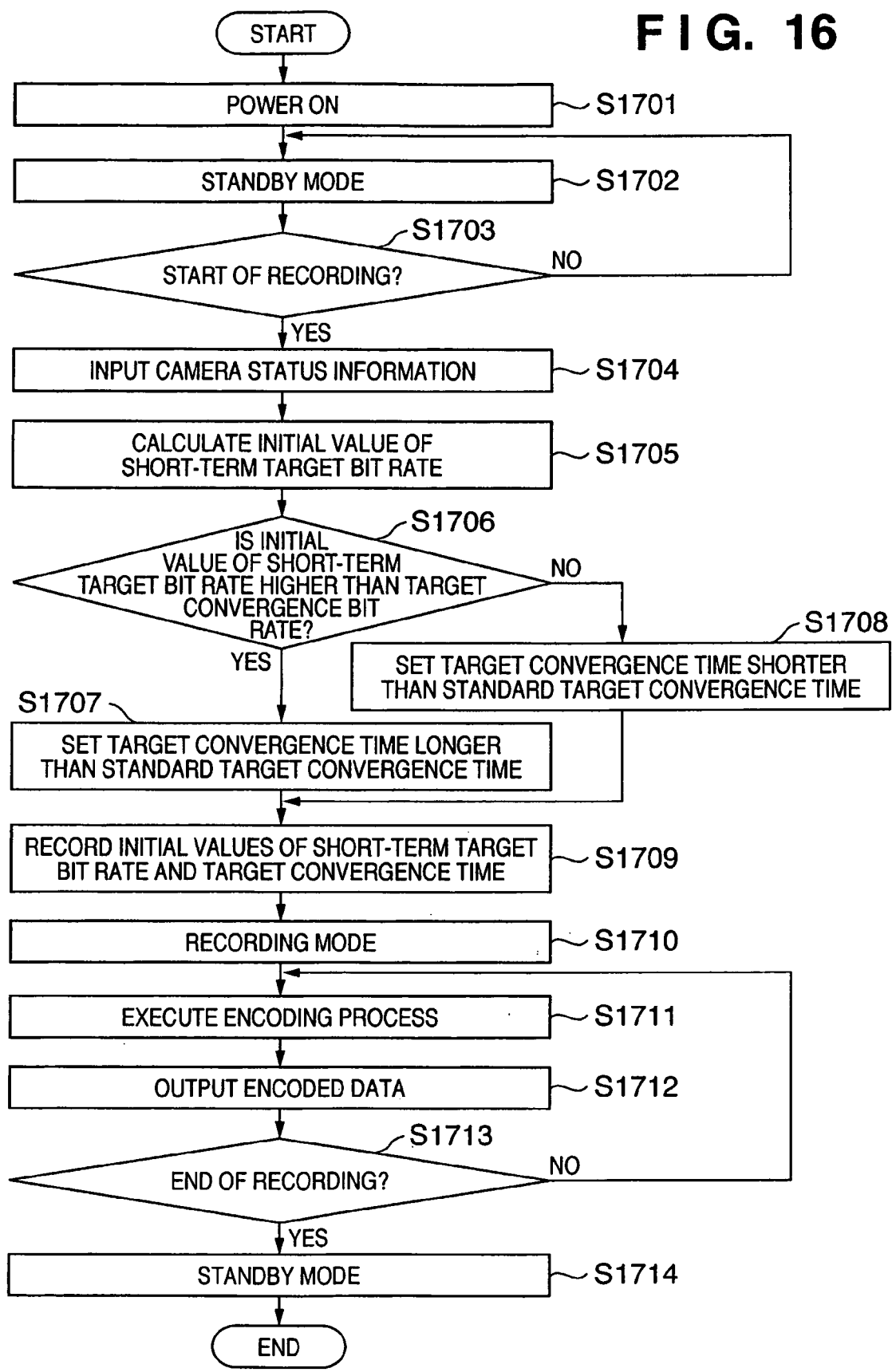

IMAGE CAPTURING APPARATUS, CONTROL METHOD THEREFOR, PROGRAM, AND STORAGE MEDIUM

BACKGROUND OF THE INVENTION

1. Field of the Invention

The present invention relates to a technique for improving the encoding efficiency of an image encoding device by using camera status information.

2. Description of the Related Art

As a high-efficiency image encoding technique, an encoding scheme such as MPEG2 (Moving Picture Experts Group Phase 2) has been established. Manufacturers are developing and commercializing DVD recorders or image capturing apparatuses such as a digital camera and digital video camera, which are adapted to record images using the MPEG2 encoding scheme. Under the circumstance, users can readily watch images using these apparatuses or personal computers or DVD players.

Various proposals are being made to improve the encoding efficiency of the MPEG2 encoding scheme. Of these proposals, for image capturing apparatuses, there is known a technique for improving the encoding efficiency by setting, in accordance with camera status information obtained by control data of a camera unit, an encoding parameter such as the target code amount used for code amount control in an encoding process (see Japanese Patent Laid-Open No. 2002-369142).

Code amount control using the MPEG2 encoding scheme will be exemplified here by TM5 as a reference soft encoder. TM5 is described in "Test Model Editing Committee: "Test-Model 5", ISO/IEC, JTC/SC29/WG11/n0400 (April 1993).

Code amount control using TM5 can be divided into the following three steps.

In the processes of step 1, the assigned code amounts to pictures in a GOP are distributed on the basis of the total amount of codes which can be assigned to pictures in the GOP which have not been encoded yet, including assignment target pictures. This distribution process is repeated in the order of encoded pictures in the GOP.

General code amount control will be described here. There are two encoding schemes for data compression based on code amount control. One is a constant bit rate (CBR) encoding scheme which keeps the generated code amount almost constant. Another one is a variable bit rate (VBR) encoding scheme which performs optimal code amount distribution in accordance with the complexity and motion magnitude of a moving image in each frame even while approximating the average value of encoding bit rates to a long-term target convergence bit rate.

Ideal code amount distribution in VBR encoding requires 2-pass arrangement, i.e., actual encoding and estimation of the generated code amount for all moving images to be encoded, so it has been conventionally implemented by an offline process using software. In recent years, hardware which executes real-time VBR encoding has been developed and recorders which are adapted to execute real-time VBR encoding superior in image quality have come into widespread nowadays. Conventional encoding by software based on prior code amount distribution for all moving images is called 2-pass encoding. Such a real-time bit rate control technique used for recorders and the like is called 1-pass encoding.

The VBR encoding bit rate control operation by 1-pass encoding achieves almost ideal code amount distribution by 2-pass encoding while being free from any influence of local characteristics such as the complexity and motion magnitude of a moving image in each frame. For this purpose, it is a common practice to average actual encoding bit rates obtained as a result of encoding at a short-term targeted encoding bit rate and to gradually control the code amount so as to adjust the resultant average value to a long-term targeted encoding bit rate in a predetermined period. A convergence time during which that average value is controlled to converge to a targeted convergence encoding bit rate is determined in accordance with the gradient of control to successively approximate the average value of actual encoding bit rates to a long-term targeted encoding bit rate.

FIG. 13 is a flowchart showing the schematic flow of bit rate control. In step S701, a maximum bit rate is assured by restricting the current quantization scale so as not to exceed its upper limit such as the maximum transfer speed, which is associated with recording and independent of the target convergence bit rate. In step S702, a virtual buffer called VBV in MPEG2 is assured by controlling the encoding bit rate so as to prevent its overflow and underflow, thus avoiding decoding failures. The encoding control processes in steps S701 and S702 are common practices, and a detailed description thereof will be omitted. In step S703, control to converge the encoding bit rate to the target convergence bit rate is done on the basis of a predetermined convergence time. The generated code amount is controlled by changing the quantization scale in accordance with a short-term target bit rate determined by the above-described bit rate control processes.

In the process of step 2, to match the assigned code amount to each picture calculated in step 1 with an actually generated code amount, the following procedure is executed. That is, a quantization scale code is calculated by feedback control for each macroblock on the basis of the capacities of three types of virtual buffers set independently for respective pictures I, P, and B.

In the process of step 3, the quantization scale code calculated in step 2 is finely quantized at a flat portion where a deterioration is visually conspicuous, and it is coarsely quantized at a portion with a complicated pattern where a deterioration is relatively inconspicuous. For this purpose, the quantization scale is changed and determined in accordance with a variable called an activity for each macroblock of 16×16 pixels.

The activity calculation method and quantization scale determination method in step 3 will be described in more detail below.

An activity representing the pattern complexity is calculated as follows. A macroblock of 16×16 pixels is divided into a total of eight blocks, i.e., four 8×8 pixel blocks in a field discrete cosine transform mode and four 8×8 pixel blocks in a frame discrete cosine transform mode. An activity is then calculated on the basis of a variance var_{sblk} of luminance signal pixel values $P_j$ of an original picture in each block. The variance of each 8×8 pixel block is calculated by:

$$\text{var\_}\{sblk\} = \sum_{j=1}^{64}(P_j - P)^2 \quad \left(P = \frac{1}{64}\sum_{j=1}^{64}P_j\right) \quad (1)$$

where P is the average pixel value of the luminance signal pixel values Pj of the 8×8 pixel blocks.

Of the total of eight variances calculated by equation (1), an activity corresponding to a minimum variance is calculated in accordance with equation (2). Using the minimum value of the variances in equation (2) is to finely quantize a flat portion in a macroblock, if any, irrespective of its extent.

$$act = 1 + \min(var\_\{sblk\}) \quad (2)$$

The activity value calculated by equation (2) becomes large if the image of interest has a complicated pattern, i.e., exhibits a large variance of luminance signal pixel values, and it becomes small if the image of interest is flat, i.e., exhibits a small variance of luminance signal pixel values. By equation (3), a normalized activity N_act is calculated such that the activity value falls within 0.5 to 2.0.

$$N\_act = (2 \times act + avg\_act)/(act + 2 \times avg\_act) \quad (3)$$

avg_act is the average activity obtained by calculating the average of the activities act encoded before one frame. To encode the first frame, the initial value of the average activity avg_act is set to 400 in the TM5 scheme.

On the basis of the normalized activity N_act calculated by equation (3) and the quantization scale code Qsc obtained in step 2, a quantization scale code MQUANT in consideration of the visual characteristic depending on an activity is given by:

$$MQUANT = Qsc \times N\_act \quad (4)$$

That is, since the quantization scale code MQUANT of a flat image which exhibits a small activity value becomes small, it is finely quantized. To the contrary, since the quantization scale code MQUANT of an image with a complicated pattern which exhibits a large activity value becomes large, it is coarsely quantized.

Code amount control using the TM5 scheme is performed by the above-described processes.

In a method of setting an encoding parameter such as the target code amount using camera status information in the prior arts such as Japanese Patent Laid-Open No. 2002-369142, an encoding unit operates to set an encoding parameter to be used in encoding using camera status information during the encoding process execution period. Therefore, to determine the initial value of an encoding parameter to be used in the main operation of an encoding unit, it must be activated to execute the encoding process before its main operation for actually recording encoded data. This amounts to excessively activating the encoding unit, resulting in an increase in power consumption.

In the TM5 scheme, to calculate, in accordance with equation (3), a normalized activity N_act in the first frame immediately after the start of the encoding process, an average activity avg_act is set as a constant value of 400. Therefore, an encoding parameter is automatically set at a constant value without activating an encoding unit before its main operation, thus solving the problem of the technique of Japanese Patent Laid-Open No. 2002-369142. However, when the encoding parameter in encoding the first frame is set at a constant value, appropriate encoding may be disturbed if the condition of a photography target image is bad. Still worse, power consumption may increase.

SUMMARY OF THE INVENTION

The present invention has been made in consideration of the above problems, and has as its object to reduce power consumption of an encoding device while more appropriately encoding a video image in the first frame.

In order to solve the above problems and achieve the object, according to a first aspect of the present invention, there is provided an image capturing apparatus comprising a camera unit which photo-electrically converts object light and outputs a video signal, an encoding unit which encodes the video signal, a camera information acquisition unit which acquires information associated with an operation status of the camera unit, and a calculation unit which calculates, on the basis of the information acquired by the camera information acquisition unit, an initial parameter serving as an encoding parameter for the encoding unit and making a variable bit rate converge, before start of an encoding operation of the encoding unit.

According to a second aspect of the present invention, there is provided a method of controlling an image capturing apparatus which comprises a camera unit which photo-electrically converts object light and outputs a video signal, and an encoding unit which encodes the video signal, comprising a camera information acquisition step of acquiring information associated with an operation status of the camera unit, and a calculation step of calculating, on the basis of the information acquired in the camera information acquisition step, an initial parameter serving as an encoding parameter for the encoding unit and making a variable bit rate converge, before start of an encoding operation of the encoding unit.

Further features of the present invention will become apparent from the following description of exemplary embodiments (with reference to the attached drawings).

BRIEF DESCRIPTION OF THE DRAWINGS

FIG. 14 is a block diagram showing the arrangement of an image capturing apparatus which incorporates an image encoding device according to the fifth embodiment of the present invention;

FIG. 16 is a flowchart showing an encoding process under code amount control corresponding to the initial values of a short-term target bit rate and target convergence time.

DESCRIPTION OF THE EMBODIMENTS

Preferred embodiments of the present invention will be described in detail below with reference to the accompanying drawings.

First Embodiment

Figure 1:
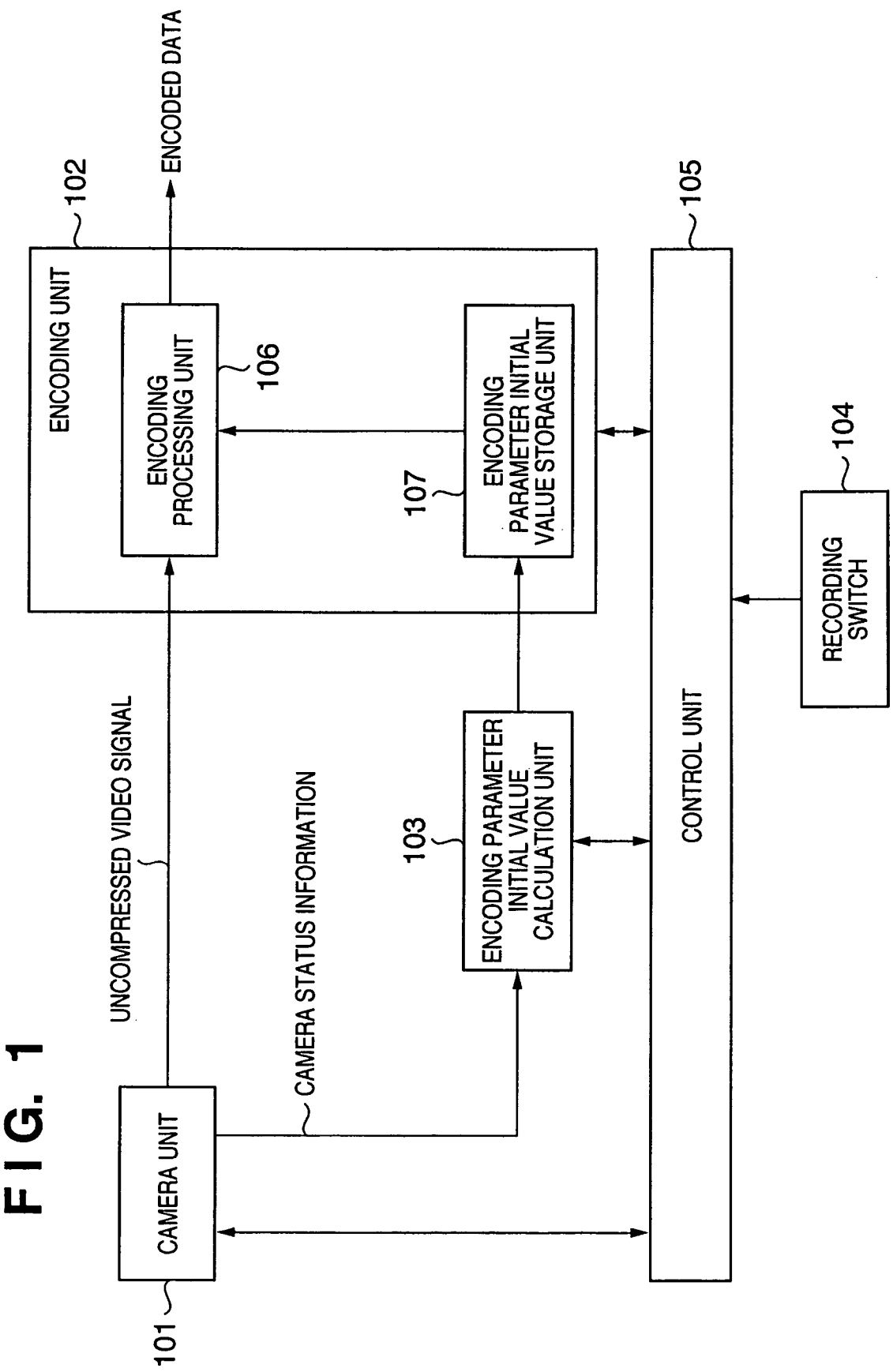
FIG. 1 is a block diagram showing the arrangement of an image capturing apparatus which incorporates an image encoding device according to the first embodiment of the present invention.

FIG. 1 is a block diagram showing the arrangement of an image capturing apparatus which incorporates an image encoding device according to the first embodiment of the present invention.

Referring to FIG. 1, a camera unit 101 executes photography and outputs an uncompressed video signal and camera status information indicating its operations and processes. An encoding parameter initial value calculation unit 103 calculates the initial value of an encoding parameter to be used for an encoding process immediately after the start of encoding, in accordance with the camera status information from the camera unit 101. An encoding unit 102 compresses and encodes the uncompressed video signal from the camera unit 101. A recording switch 104 is used to issue a recording start/stop instruction. A control unit 105 controls the camera unit 101, encoding unit 102, and encoding parameter initial value calculation unit 103. The encoding unit 102 comprises an encoding processing unit 106 and encoding parameter initial value storage unit 107.

The camera unit 101, encoding unit 102, and encoding parameter initial value calculation unit 103 will be described in detail next.

The arrangement of the camera unit 101 will be explained first with reference to FIG. 2.

The camera unit 101 comprises a lens 201, image capturing unit 202, A/D conversion unit 203, camera signal processing unit 204, and camera control unit 205. The camera unit 101 captures an object image and outputs an uncompressed video signal and camera status information.

The operation of the camera unit 101 will be explained.

The lens 201 guides object light to the image capturing unit 202. The lens 201 executes a zoom operation, focusing operation, and the like in correspondence with control signals output from the camera control unit 205. The image capturing unit 202 converts the object light into an electrical signal using a CCD or CMOS. The A/D conversion unit 203 converts an analog video signal output from the image capturing unit 202 into a digital video signal. The camera signal processing unit 204 executes processes such as γ correction and white balance adjustment for the digital video signal output from the A/D conversion unit 203, and outputs an uncompressed video signal. The camera control unit 205 controls the camera unit 101 to output camera status information. This camera status information indicates operations and processes, which can be obtained by analyzing control data of modules which constitute the camera unit 101. For example, camera status information includes the zoom operation state which can be obtained from control data of the lens 201, and the focus state which can be obtained, from control data of the camera signal processing unit 204. The above description is related to the camera unit 101.

The arrangement of the encoding unit 102 will be explained second with reference to FIGS. 1 and 3.

The encoding unit 102 comprises the encoding processing unit 106 and encoding parameter initial value storage unit 107. In this embodiment, a case wherein the encoding processing unit 106 adopts an MPEG encoding scheme will be exemplified. However, the encoding scheme is not limited to this.

Figure 3:
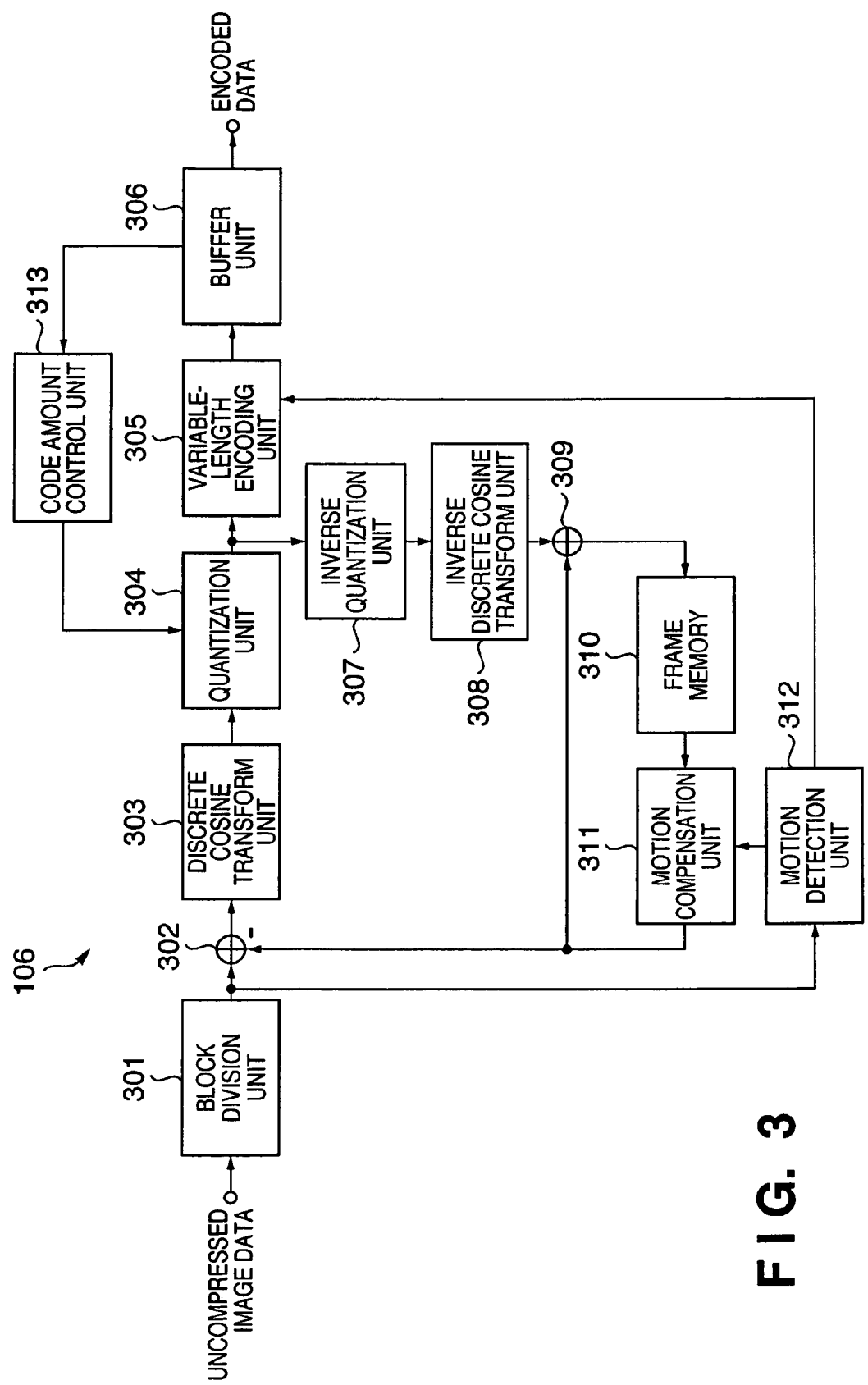
FIG. 3 is a block diagram showing the arrangement of an encoding unit.

As shown in FIG. 3, the encoding processing unit 106 in FIG. 1 comprises a block division unit 301, subtractor 302, discrete cosine transform unit 303, quantization unit 304, variable-length encoding unit 305, buffer unit 306, inverse quantization unit 307, inverse discrete cosine transform unit 308, adder 309, frame memory 310, motion compensation unit 311, motion detection unit 312, and code amount control unit 313. The initial value of an encoding parameter stored in the encoding parameter initial value storage unit 107 in FIG. 1 is input to the encoding processing unit 106 immediately before the start of encoding. In accordance with the input initial value of that encoding parameter, the encoding processing unit 106 divides an uncompressed video signal output from the camera unit 101 into blocks, executes an encoding process for each block, and outputs encoded data.

The encoding process will be explained with reference to FIG. 3.

The block division unit 301 divides input uncompressed image data into, e.g., 16×16 pixel blocks. The subtractor 302 subtracts predictive image data from the input image data and outputs residual image data. Predictive image data generation will be described later.

The discrete cosine transform unit 303 orthogonally transforms the residual image data output from the subtractor 302 and outputs transform coefficients. The quantization unit 304 quantizes that transform coefficients on the basis of a quantization scale. The variable-length encoding unit 305 receives the transform coefficients quantized by the quantization unit 304 and encodes them using variable-length codes to form encoded data. The encoded data are temporarily accumulated in the buffer unit 306 and output afterward. By using the above-described method such as TM5, the code amount control unit 313 determines a quantization scale so as to prevent overflow and underflow of the data accumulated in the buffer unit 306, and outputs them to the quantization unit 304.

The transform coefficients quantized by the quantization unit 304 are also used to generate predictive image data. The inverse quantization unit 307 inversely quantizes the transform coefficients quantized by the quantization unit 304. The inverse discrete cosine transform unit 308 executes inverse discrete cosine transform for the transform coefficients inversely quantized by the inverse quantization unit 307, and outputs them as residual decoded image data. The adder 309 adds the residual decoded image data and the predictive image data and outputs the sum as reconstructed image data. The reconstructed image data are recorded in the frame memory 310. Of the reconstructed image data, data which is likely to be referred to in subsequent prediction is saved in the frame memory 310 for a while.

On the basis of motion vector information detected by the motion detection unit 312, the motion compensation unit 311 executes motion compensation using the reconstructed image data recorded in the frame memory 310 to generate predictive image data. The motion detection unit 312 detects a motion vector in the input image data and outputs the detected motion vector information to the motion compensation unit 311 and variable-length encoding unit 305.

The encoding parameter storage unit 107 in FIG. 1 stores the initial value of an encoding parameter calculated by the encoding parameter initial value calculation unit 103 (to be described later). The encoding processing unit 106 reads the initial value of an encoding parameter stored in the encoding parameter initial value storage unit 107 immediately before the start of the encoding process. The encoding processing unit 106 starts the encoding process in accordance with the initial value of that encoding parameter. The above description is related to the encoding unit 102.

The encoding parameter initial value calculation unit 103 will be explained third with reference to FIGS. 1, 4, and 5.

The encoding parameter initial value calculation unit 103 acquires camera status information from the camera unit 101 to calculate the initial value of an encoding parameter. As a practical example of encoding parameter initial value calculation, initial value calculation for an average activity avg_act in equation (3) described above will be explained here.

The average activity will be explained with reference to FIG. 4.

The average activity avg_act is the average value of activities act in a frame immediately before the encoding target frame. In the TM5 scheme, the initial value of the average activity avg_act is set to 400. That is, when a normalized activity N_act in the first frame immediately after the start of the encoding process is to be calculated by the TM5 scheme in accordance with equation (3), the average activity avg_act is set as a constant value of 400. In this embodiment, while following the TM5 scheme, the value of avg_act to be applied to the encoding parameter in the first frame is changed in accordance with the status of the camera unit 101. This makes it possible to more appropriately encode an image in the first frame.

Figure 4:
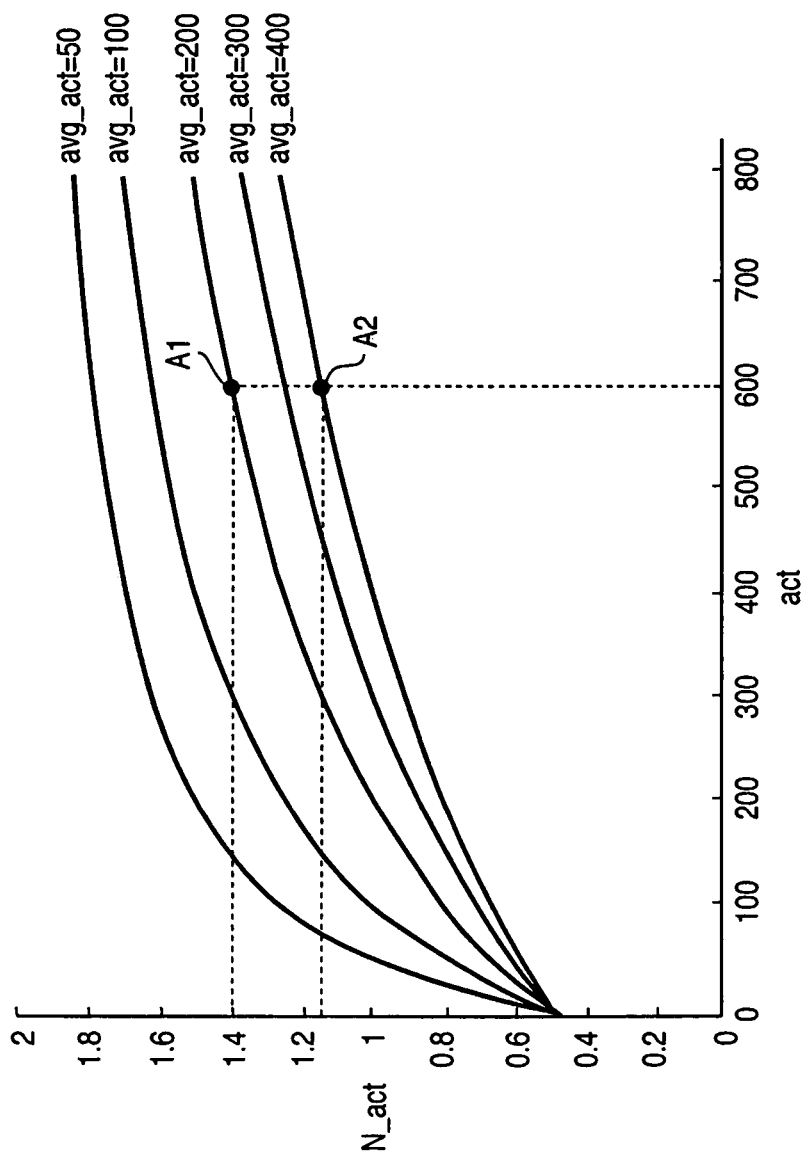
FIG. 4 is a graph for explaining the relationship between the normalized activity and the activity for each average activity.

FIG. 4 is a graph showing the relationship between the activity act and the normalized activity N_act in equation (3) for each average activity avg_act. The abscissa represents the activity value, and the ordinate represents the normalized activity. For example, at a point A1 in FIG. 4, i.e., when the value of the average activity avg_act is 200 and the value of the activity act is 600, the value of the normalized activity N_act is 1.4. As can be seen from FIG. 4, when normalized activity values corresponding to the same activity value (e.g., points A1 and A2) are compared, a normalized activity value corresponding to a smaller average activity value (point A1) is calculated to be larger by equation (3). This amounts to coarser quantization. To the contrary, a normalized activity value corresponding to a larger average activity value (point A2) is calculated to be smaller by equation (3). This amounts to finer quantization. That is, if the activity value which expresses the image complexity is the same, a smaller average activity value amounts to coarser quantization.

An average activity initial value calculation operation according to this embodiment will be described next with reference to FIG. 5. FIG. 5 is a timing chart showing an example of average activity initial value calculation. a in FIG. 5 represents whether the camera unit 101 is set in an active state or sleep state, and b in FIG. 5 represents whether the encoding unit 102 is set in an active state or sleep state. The active state of the camera unit 101 indicates, e.g., a state in which the camera unit 101 so operates as to output an uncompressed video signal and camera status information. The active state of the encoding unit 102 indicates, e.g., a state in which the encoding processing unit 106 is allowed to execute the encoding process and to output encoded data.

The sleep state of the camera unit 101 or encoding unit 102 indicates the following state. That is, the camera unit 101 or encoding processing unit 106 does not operate because the camera unit 101 or encoding processing unit 106 is not powered on or a clock to be input to the camera unit 101 or encoding processing unit 106 is stopped.

When the camera unit 101 enters the sleep state, it does not output an uncompressed video signal and camera status information. When the encoding unit 102 enters the sleep state, it does not output encoded data but can record the initial value of an encoding parameter in the encoding parameter initial value storage unit 107.

Figure 5:
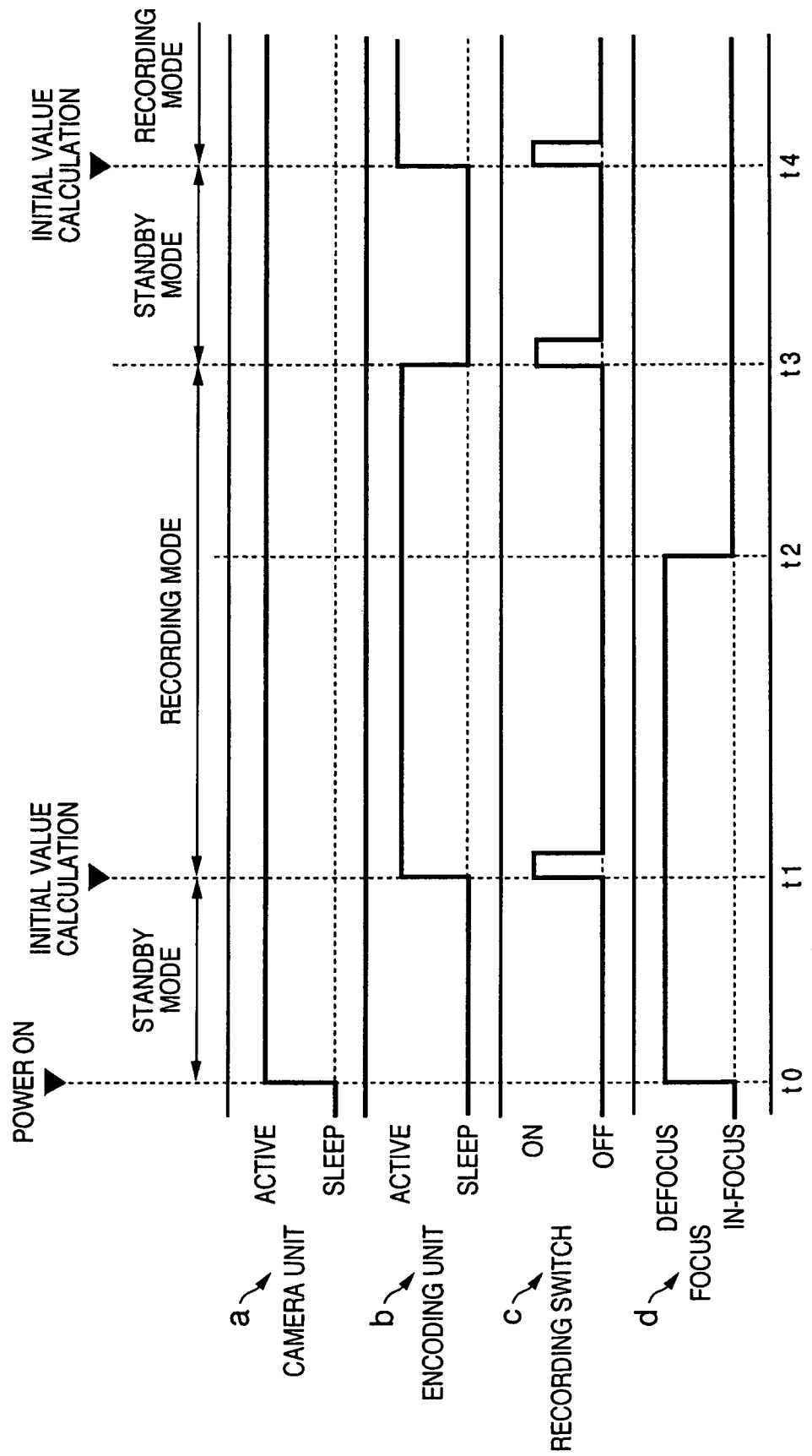
FIG. 5 is a timing chart showing the operation of an encoding parameter initial value calculation unit.

After being powered on, most of image capturing apparatuses activate only the camera unit 101 but stop the encoding unit 102 until recording starts so as to reduce power consumption. A state in which the camera unit 101 and the encoding unit 102 are respectively set in the active state and sleep state, i.e., a state during the period from time t0 to time t1 or from time t3 to time t4 in FIG. 5 is called a standby mode. A state in which both the camera unit 101 and encoding unit 102 are set in the active state, i.e., a state during the period from time t1 to time t3 or after time t4 in FIG. 5 is called a recording mode.

c in FIG. 5 represents a state in which the recording switch 104 is pressed. The recording switch 104 is used to issue a recording start/end instruction. In this example, by pressing the recording switch 104 once at time t1, a shift from the standby mode to the recording mode is made to start recording. By pressing the recording switch 104 again at time t3, a shift from the recording mode to the standby mode is made to end recording. By pressing the recording switch 104 again at time t4, a shift from the standby mode to the recording mode is made to start recording.

d in FIG. 5 represents focus information as an example of camera status information input from the camera unit 101 to the encoding parameter initial value calculation unit 103. The focus information is obtained from the camera signal processing unit 204 and indicates the focus state. d in FIG. 5 expresses an in-focus state as "low" and a defocus state as "high". In this example, the focus is kept unadjusted during the period from time t0 to time t2. Therefore, an uncompressed video signal output from the camera unit 101 to the encoding unit 102 during the period from time t0 to time t2 represents a burred image. On the other hand, the focus is kept adjusted after time t2. Therefore, an uncompressed in-focus video signal is output from the camera unit 101 to the encoding unit 102 after time t2.

The encoding parameter initial value calculation unit 103 acquires camera status information at time t1 immediately before switching from the standby mode to the recording mode, i.e., corresponding to the moment when the photographer presses the recording switch 104. The encoding parameter initial value calculation unit 103 calculates the initial value of an encoding parameter only once, and outputs and records it in the encoding parameter initial value storage unit 107. After that, the encoding processing unit 106 starts the encoding process in accordance with the initial value of that encoding parameter stored in the encoding parameter initial value storage unit 107.

In the example of FIG. 5, focus information which is represented by d and serves as camera status information at the moment when the photographer presses the recording switch 104 at time t1 indicates a defocus state. Accordingly, a blurred image is input to the encoding processing unit 106. The blurred image rarely attracts audience's attention at the time of image playback. Even if a small amount of codes are given to that image and thereby decrease a perceived resolution, its influence is small. In this case, the average activity value is set small so as to execute coarse quantization (e.g., 50). Focus information at the moment when the photographer presses the recording switch 104 at time t4 indicates an in-focus state. Accordingly, an in-focus image is input to the encoding processing unit 106. The in-focus image attracts a great deal of audience's attention at the time of image playback. A large amount of codes should be given to that image and thereby improve a perceived resolution. In this case, the average activity value is set large so as to execute fine quantization (e.g., 400).

As described above, the encoding parameter initial value calculation unit 103 outputs a small initial value of the average activity in case of a blurred image, and it outputs a large initial value of the average activity in case of an in-focus image. This makes it possible to coarsely quantize a blurred image immediately after the start of encoding and finely quantize an in-focus image.

The camera status information may be camera shake information, zoom information, or pan/tilt information. Assume that the camera status information is the camera shake information. If a camera shake is generated the moment the photographer presses the recording switch 104, it acts to shake a video image, resulting in a decrease in degree of audience's attention. In this case, the average activity value is set small so as to execute coarse quantization (e.g., 50). If no camera shake is generated the moment the photographer presses the recording switch 104, the video image does not shake, resulting in an increase in degree of audience's attention. In this case, the average activity value is set large so as to execute fine quantization (e.g., 400).

Assume that the camera status information is zoom information or pan/tilt information. If a video image is being zoomed or panned/tilted the moment the photographer presses the recording switch 104, that video image is moving at high speed, resulting in a decrease in degree of audience's attention. In this case, the average activity value is set small so as to execute coarse quantization (e.g., 50). If a video image is not being zoomed or panned/tilted the moment the photographer presses the recording switch 104, the degree of audience's attention increases. In this case, the average activity value is set large so as to execute fine quantization (e.g., 400).

Figure 6:
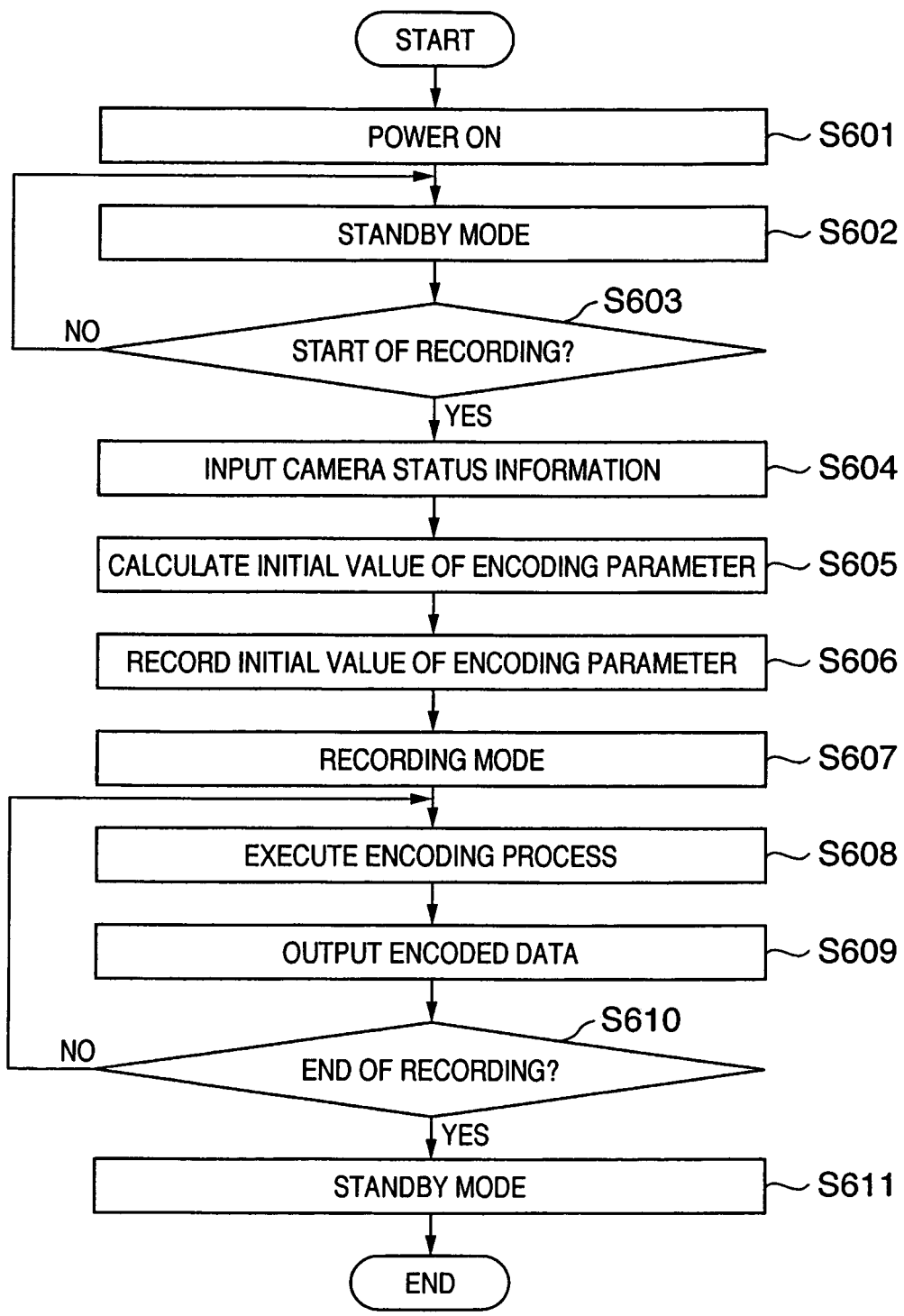
FIG. 6 is a flowchart showing an operation according to the first embodiment.

A process of calculating the initial value of an encoding parameter in accordance with camera status information according to this embodiment described above to execute encoding in accordance with the initial value of that encoding parameter will be described next with reference to the flowchart in FIG. 6.

In step S601, the image capturing apparatus main body is powered on. Upon being powered on, the image capturing apparatus enters the standby mode in step S602. The camera unit 101 and encoding unit 102 enter the active state and sleep state, respectively.

Through display devices such as a finder and liquid crystal monitor (not shown) accessory to the image capturing apparatus, the photographer executes operations such as determination of a composition desired to be photographed. Upon determining the composition desired to be photographed, the photographer presses the recording switch 104 of the image capturing apparatus in step S603 to issue a recording start instruction. The encoding parameter initial value calculation unit 103 acquires camera status information from the camera unit 101 in step S604 the moment the recording switch 104 is pressed in step S603. In step S605, the encoding parameter initial value calculation unit 103 calculates the initial value of an encoding parameter by the above-described method in accordance with the camera status information acquired from the camera unit 101 in step S604. In step S606, the encoding parameter initial value calculation unit 103 outputs and records the calculated initial value in the encoding parameter initial value storage unit 107.

When the initial value of the encoding parameter is recorded, a shift to the recording mode is made in step S607 to cause the camera unit 101 and the encoding unit 102 to enter the active state. In step S608, the encoding processing unit 106 reads the initial value of the encoding parameter recorded in the encoding parameter initial value storage unit 107 in step S606. The encoding processing unit 106 executes the encoding process in accordance with the initial value of that encoding parameter and outputs encoded data in step S609.

To encode video data in the first frame immediately after the photographer presses the recording switch 104, the above initial value of the encoding parameter is used. Since, however, average activity information in a frame immediately before the current frame has already been obtained in the second and subsequent frames, an encoding parameter is set on the basis of that information. That is, an encoding parameter changes in real time in the second and subsequent frames depending on the pattern of a video image. This encoding process is executed until the photographer presses the recording switch 104 again to end recording in step S610. If recording is determined to be ended in step S610, the image capturing apparatus enters the standby mode in step S611, thus ending recording.

Second Embodiment

The second embodiment of the present invention will be described next. The same reference numerals as in the first embodiment denote constituent components which execute the same operations and processes, and a description thereof will be omitted.

The arrangement of an image capturing apparatus according to this embodiment is apparently the same as that of the first embodiment shown in FIG. 1, and a description thereof will be omitted.

Figure 7:
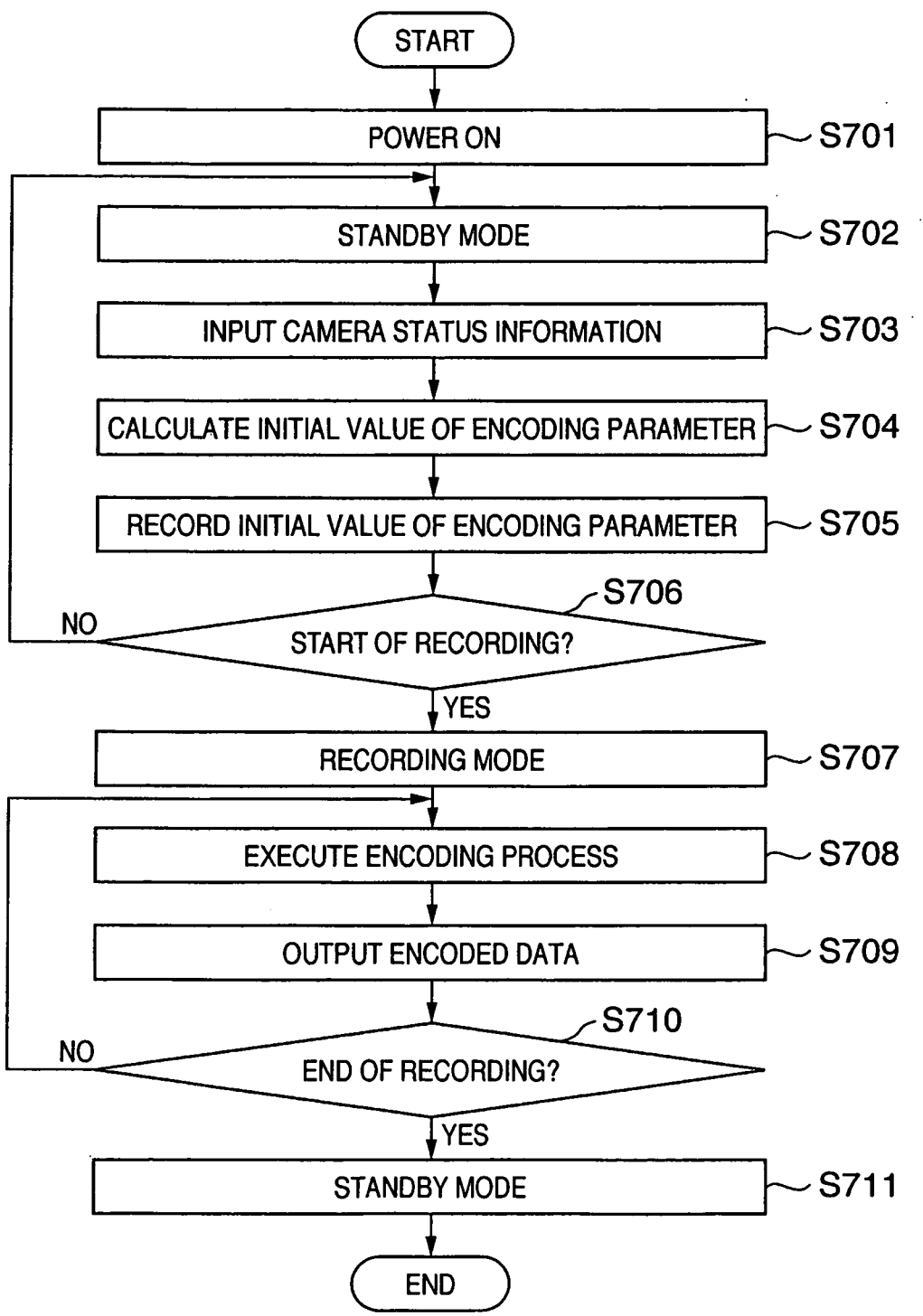
FIG. 7 is a flowchart showing an operation according to the second embodiment.

A process of calculating the initial value of an encoding parameter in accordance with camera status information according to this embodiment to execute encoding in accordance with the initial value of that encoding parameter will be described next with reference to the flowchart in FIG. 7.

In step S701, the image capturing apparatus main body is powered on. Upon being powered on, the image capturing apparatus enters the standby mode in step S702. A camera unit 101 and encoding unit 102 enter the active state and sleep state, respectively.

In the standby mode, an encoding parameter initial value calculation unit 103 acquires camera status information from the camera unit 101 in step S703 to calculate the initial value of an encoding parameter in step S704 by the same process as that in the first embodiment. In step S705, the initial value of the encoding parameter calculated in step S704 is recorded in an encoding parameter initial value storage unit 107.

In step S706, processes from step S702 to step S705 are executed until the photographer presses a recording switch 104 to start recording. Calculation and recording of the initial value of an encoding parameter are periodically repeated. That is, periodical update of the initial value of an encoding parameter recorded in the encoding parameter initial value storage unit 107 continues.

If recording starts in step S706, a shift to the recording mode is made in step S707. As in the process according to the first embodiment, in step S708, an encoding processing unit 106 reads the initial value of the encoding parameter recorded in the encoding parameter initial value storage unit 107 in step S705. The encoding processing unit 106 executes the encoding process in accordance with the initial value of that encoding parameter and outputs encoded data in step S709. This encoding process is executed until the photographer presses the recording switch 104 again to end recording in step S710.

If recording is determined to be ended in step S710, the image capturing apparatus enters the standby mode in step S711, thus ending recording.

Third Embodiment

The third embodiment of the present invention will be described next.

Figure 8:
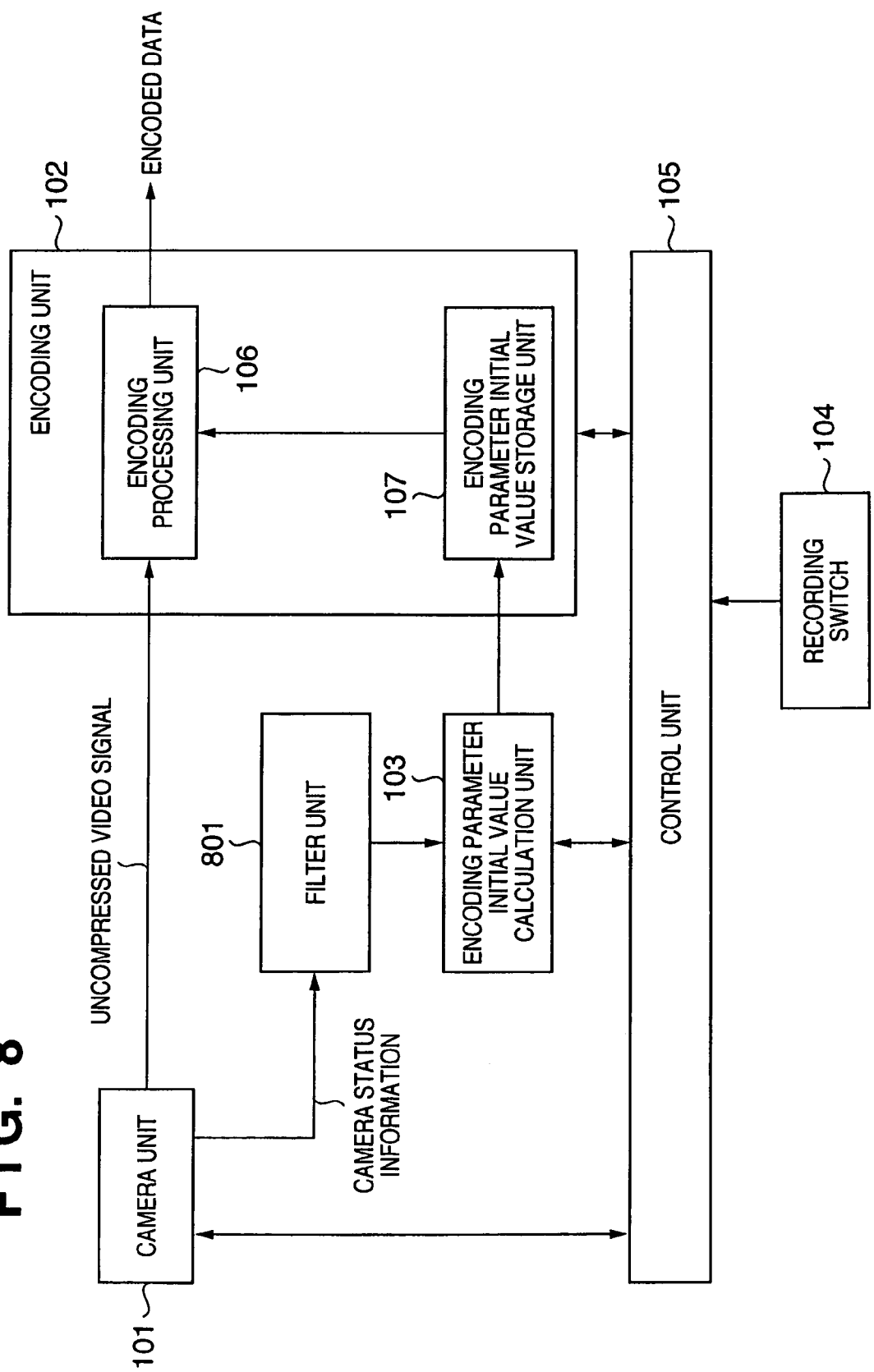
FIG. 8 is a block diagram showing the arrangement of an image capturing apparatus which incorporates an image encoding device according to the third embodiment of the present invention.

FIG. 8 is a block diagram showing the arrangement of an image capturing apparatus which incorporates an image encoding device according to the third embodiment of the present invention. The third embodiment will be described below with reference to FIG. 8. The same reference numerals as in the first and second embodiments denote constituent components which execute the same operations and processes, and a description thereof will be omitted.

Figure 9:
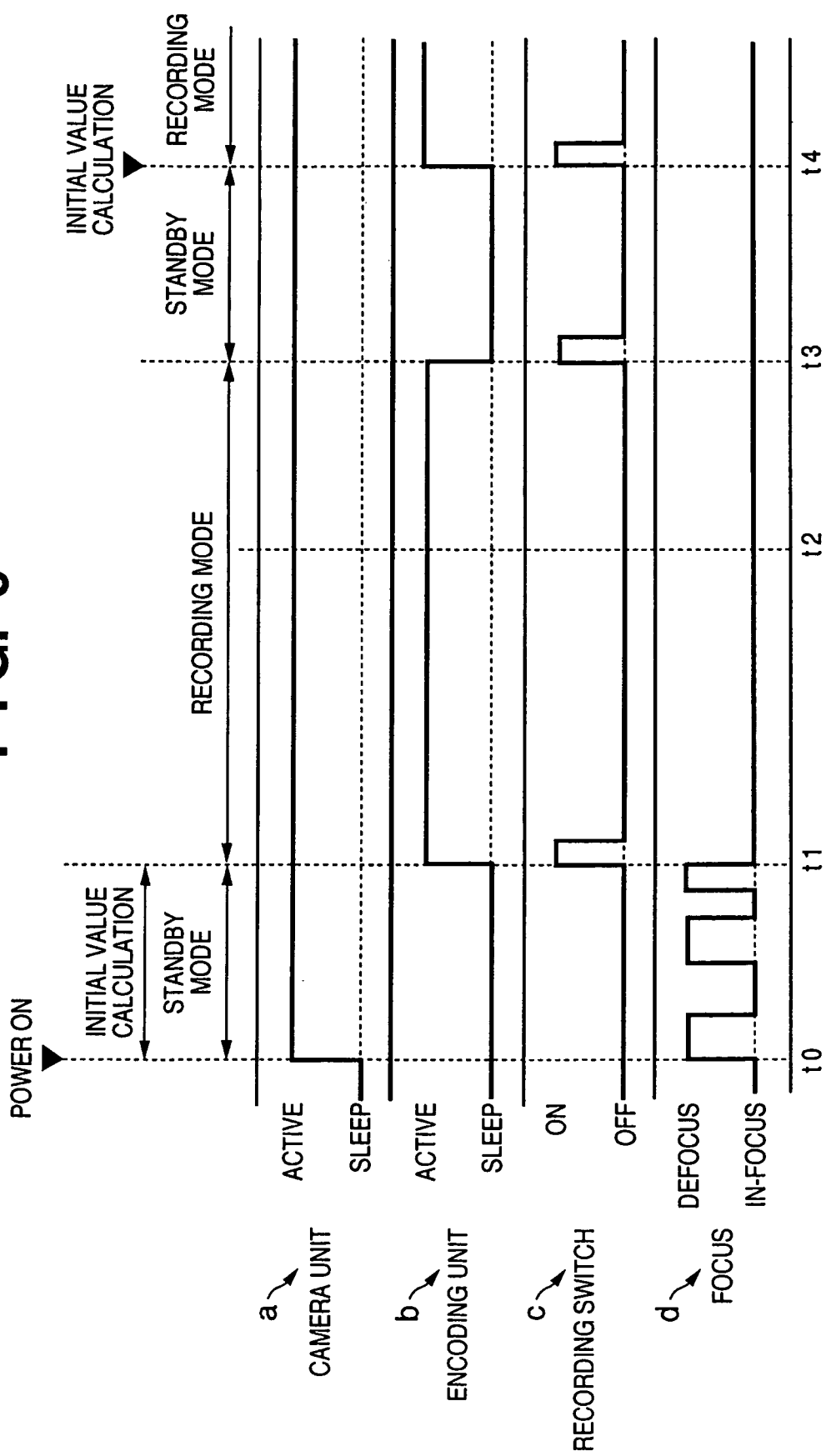
FIG. 9 is a timing chart showing the operation of an encoding parameter initial value calculation unit.

Referring to FIG. 8, a filter processing unit 801 filters camera status information output from a camera unit 101 and outputs the filtered camera status information. As an example of the filter process, a low-pass filter process or high-pass filter process may be done. However, a smoothing filter as an example of the low-pass filter, which calculates a temporal average value will be described here with reference to FIG. 9.

d in FIG. 9 represents focus information indicating the focus state. In the example of FIG. 9, focus information represented by d indicates that an in-focus state and defocus state are repetitively set during the period from time t0 to time t1. The filter processing unit 801 periodically acquires focus information which changes as represented by d in FIG. 9 to execute a smoothing process. The filter processing unit 801 outputs the smoothed focus information to an encoding parameter initial value calculation unit 103. a to c in FIG. 9 represent contents identical to those represented by a to c in FIG. 5.

Figure 10:
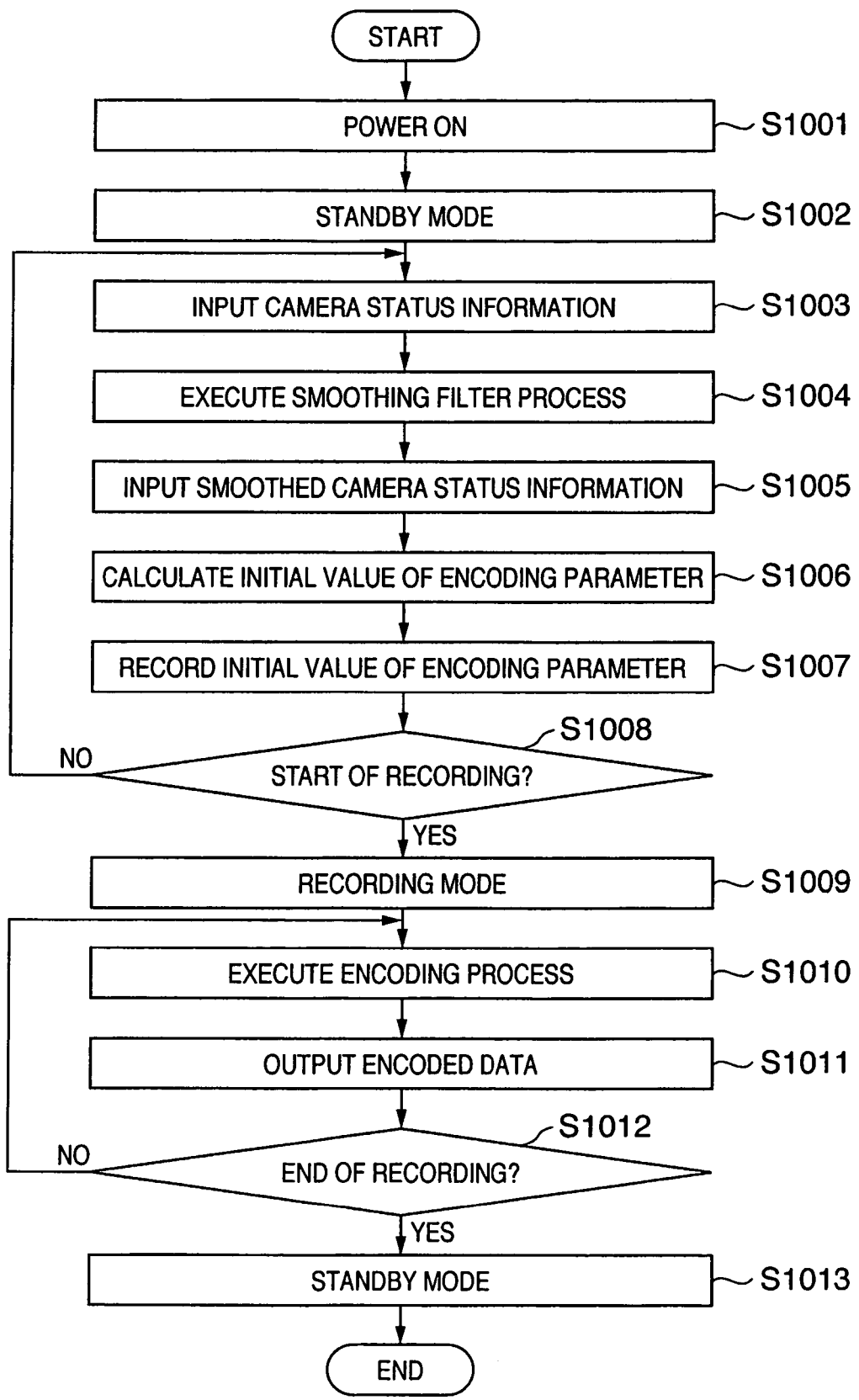
FIG. 10 is a flowchart showing an operation according to the third embodiment.

A process of periodically calculating the initial value of an encoding parameter in accordance with smoothed camera status information to execute encoding in accordance with the initial value of that encoding parameter will be described next with reference to the flowchart in FIG. 10.

In step S1001, the image capturing apparatus main body is powered on. Upon being powered on, the image capturing apparatus enters the standby mode in step S1002. A camera unit 101 and encoding unit 102 enter the active state and sleep state, respectively.

In step S1003, the filter processing unit 801 acquires camera status information from the camera unit 101 to execute the smoothing filter process in step S1004. In step S1005, the encoding parameter initial value calculation unit 103 acquires the smoothed camera status information output from the filter processing unit 801 in step S1004. In step S1006, the encoding parameter initial value calculation unit 103 calculates the initial value of an encoding parameter in accordance with the smoothed camera status information by the same process as that in the first embodiment. In step S1007, the initial value of the encoding parameter calculated in step S1006 is recorded in an encoding parameter initial value storage unit 107.

In step S1008, processes from step S1002 to step S1007 are executed until the photographer presses a recording switch 104 to start recording. Calculation and recording of the initial value of an encoding parameter are periodically repeated. That is, periodical update of the initial value of an encoding parameter recorded in the encoding parameter initial value storage unit 107 continues.

If recording starts in step S1008, a shift to the recording mode is made in step S1009. As in the process according to the first embodiment, in step S1010, an encoding processing unit 106 reads the initial value of the encoding parameter recorded in the encoding parameter initial value storage unit 107 in step S1007. The encoding processing unit 106 executes the encoding process in accordance with the initial value of that encoding parameter and outputs encoded data in step S1011.

The encoding parameter initial value calculation unit 103 need not always periodically calculate the initial value of an encoding parameter. That is, as in the first embodiment, when a shift from the standby mode to the recording mode is to be made, the encoding parameter initial value calculation unit 103 may calculate the initial value of an encoding parameter once and output it to the encoding parameter initial value storage unit 107.

This encoding process is executed until the photographer presses the recording switch 104 again to end recording in step S1012. If recording is determined to be ended in step S1012, the image capturing apparatus enters the standby mode in step S1013, thus ending recording.

As described above, according to the first and third embodiments, when a shift from a standby mode in which an encoding unit does not operate to a recording mode in which the encoding unit executes the encoding process is to be made, the initial value of an encoding parameter is determined in accordance with camera status information without activating the encoding unit. Hence, unlike the prior arts, the initial value of an encoding parameter can be appropriately set without executing the encoding process prior to the main operation for causing the encoding unit to actually record encoded data. This makes it possible to reduce power consumption of the image encoding device.

Fourth Embodiment

The first to third embodiments have been described with reference to the case wherein the code amount control method for encoding uses the TM5 scheme. However, in the fourth embodiment, the code amount control method uses a scheme different from TM5.

Figure 2:
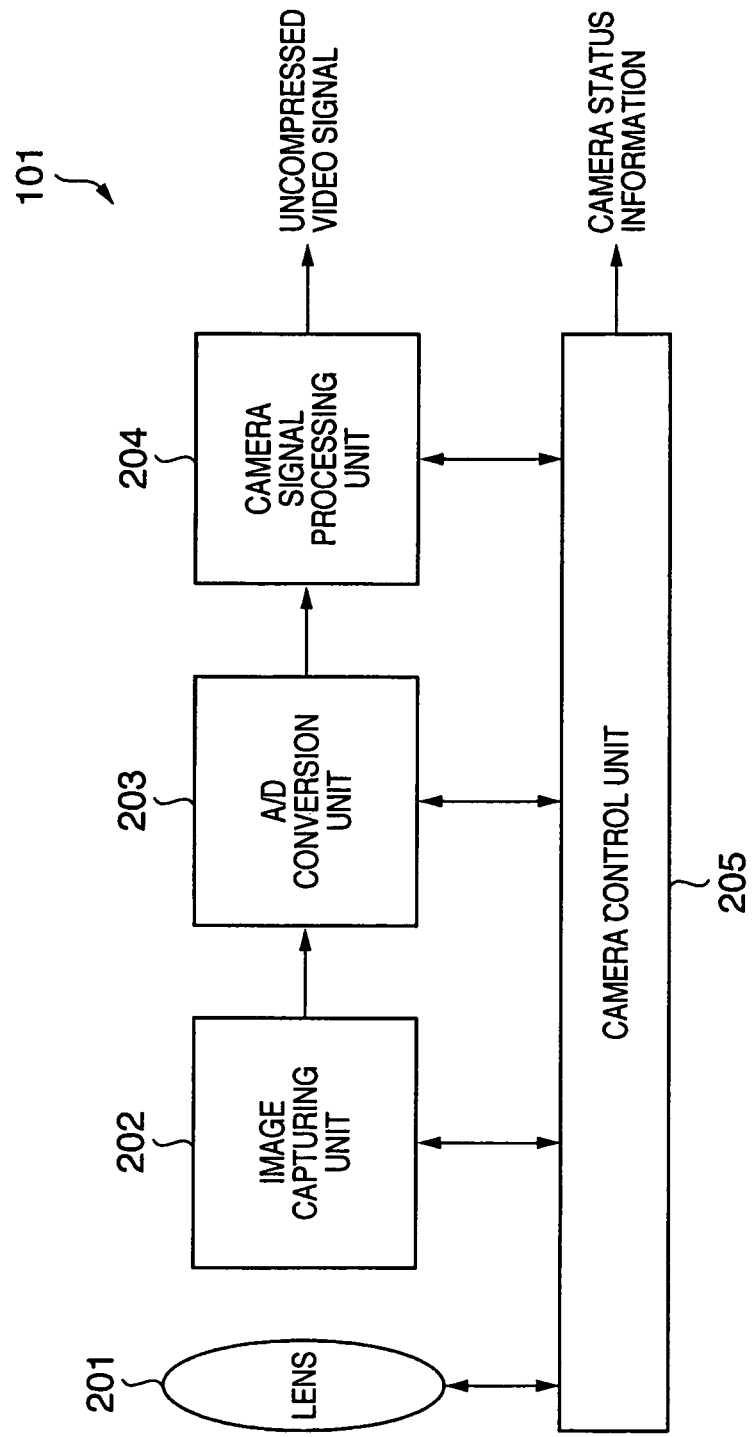
FIG. 2 is a block diagram showing the arrangement of a camera unit.

The arrangements of an image capturing apparatus, camera unit, and encoding processing unit according to this embodiment are apparently the same as those of the first embodiment shown in FIGS. 1 to 3, and a description thereof will be done by citing FIGS. 1 to 3.

The constituent components in FIGS. 1 and 2 are thoroughly the same as those in the first embodiment, and a description thereof will be omitted. Since the encoding processing unit shown in FIG. 3 includes constituent components which execute internal processes different from those in the first embodiment, an encoding unit 102 including an encoding processing unit 106 will be described with reference to FIGS. 1 to 3.

The encoding unit 102 comprises the encoding processing unit 106 and an encoding parameter initial value storage unit 107. This embodiment will exemplify a case wherein the encoding processing unit 106 uses MPEG as the encoding scheme. However, the encoding scheme is not limited to this.

As shown in FIG. 3, the encoding processing unit 106 in FIG. 1 comprises a block division unit 301, subtractor 302, discrete cosine transform unit 303, quantization unit 304, variable-length encoding unit 305, buffer unit 306, inverse quantization unit 307, inverse discrete cosine transform unit 308, adder 309, frame memory 310, motion compensation unit 311, motion detection unit 312, and code amount control unit 313. The encoding processing unit 106 reads the initial value of an encoding parameter stored in the encoding parameter initial value storage unit 107 in FIG. 1 immediately before the start of encoding. In accordance with the initial value of that encoding parameter, the encoding processing unit 106 divides an uncompressed video signal output from a camera unit 101 into blocks, executes an encoding process for each block, and outputs encoded data.

The encoding process will be explained with reference to FIG. 3.

The block division unit 301 divides input uncompressed image data into, e.g., 16×16 pixel blocks. The subtractor 302 subtracts predictive image data from the input image data and outputs residual image data.

The discrete cosine transform unit 303 orthogonally transforms the residual image data output from the subtractor 302 and outputs transform coefficients. The quantization unit 304 quantizes those transform coefficients on the basis of a quantization scale. By changing this quantization scale, the quantized transform coefficient values largely change. In response to this, the generated code amount changes.

The variable-length encoding unit 305 receives the transform coefficients quantized by the quantization unit 304 and encodes them using variable-length codes to form encoded data. The encoded data are temporarily accumulated in the buffer unit 306 and output afterward.

The code amount control unit 313 executes the following control. On the basis of the variable bit rate (VBR) scheme using information such as the code generation amount and buffer occupation ratio obtained by the buffer unit 306, the code amount control unit 313 executes quantization scale control for converging the encoding bit rate to a long-term target convergence bit rate for the quantization unit 304.

The transform coefficients quantized by the quantization unit 304 are also used to generate predictive image data. The inverse quantization unit 307 inversely quantizes the transform coefficients quantized by the quantization unit 304. The inverse discrete cosine transform unit 308 executes inverse discrete cosine transform for the transform coefficients inversely quantized by the inverse quantization unit 307, and outputs them as residual decoded image data. The adder 309 adds the residual decoded image data and the predictive image data and outputs the sum as reconstructed image data. The reconstructed image data are recorded in the frame memory 310. Of the reconstructed image data, data which is likely to be referred to in subsequent prediction is saved in the frame memory 310 for a while.

On the basis of motion vector information detected by the motion detection unit 312, the motion compensation unit 311 executes motion compensation using the reconstructed image data recorded in the frame memory 310 to generate predictive image data. The motion detection unit 312 detects a motion vector in the input image data and outputs the detected motion vector information to the motion compensation unit 311 and variable-length encoding unit 305.

The encoding parameter storage unit 107 in FIG. 1 stores the initial value of an encoding parameter calculated by an encoding parameter initial value calculation unit 103 (to be described later). The code amount control unit 313 reads the initial value of an encoding parameter stored in the encoding parameter initial value storage unit 107 immediately before the start of the encoding process. The encoding processing unit 106 starts the encoding process in accordance with the initial value of that encoding parameter. The above description is related to the encoding unit 102.

The encoding parameter initial value calculation unit 103 will be explained third with reference to FIGS. 1, 5, and 11A and 11B.

The encoding parameter initial value calculation unit 103 in FIG. 1 acquires camera status information from the camera unit 101 to calculate the initial value of an encoding parameter. As a practical example of encoding parameter initial value calculation, the initial value of a short-term target bit rate in code amount control by the variable bit rate (VBR) scheme will be described.

The encoding bit rate in code amount control by the variable bit rate (VBR) scheme will be explained with reference to FIGS. 11A and 11B.

Figure 11:
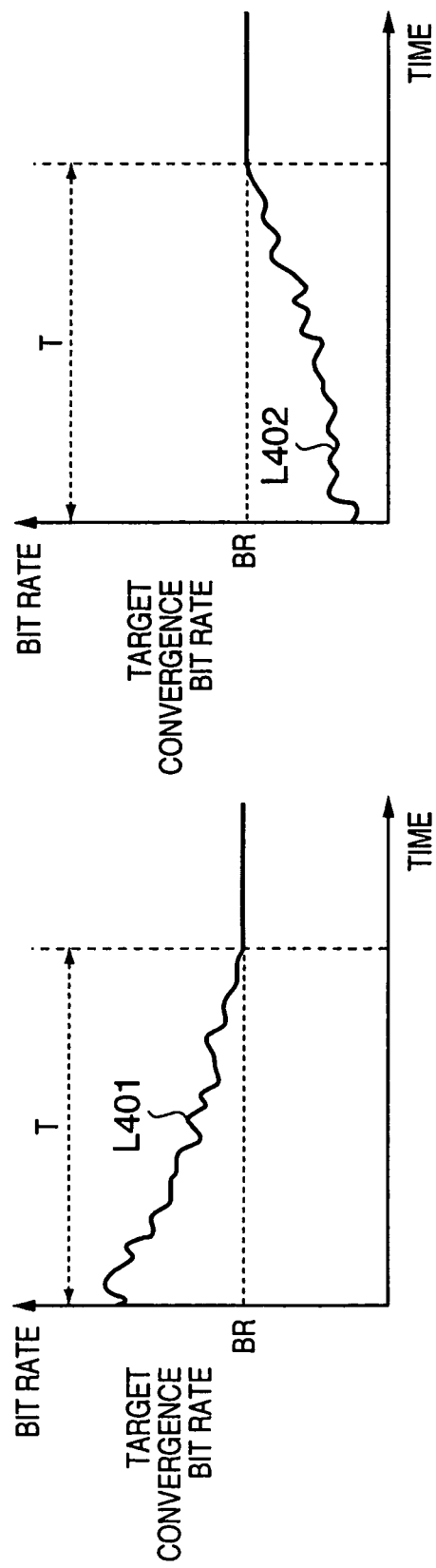
FIGS. 11A and 11B are graphs showing the convergence characteristics of encoding bit rates.

FIGS. 11A and 11B are graphs showing the encoding bit rate control states. L401 and L402 represent changes in encoding bit rate per unit time and gradually converge to a target convergence bit rate BR in a convergence time T.

As described above, in code amount control by the variable bit rate (VBR) scheme, for example, a short-term target encoding bit rate is set for each picture. The VBR scheme averages actual encoding bit rates obtained as a result of encoding, and performs optimal code amount distribution in accordance with the complexity and motion magnitude of a moving image in each frame even while approximating the average value to a long-term target convergence bit rate.

There are two convergence characteristics in which the average value of actual encoding bit rates obtained as a result of encoding is allowed to converge to the target convergence bit rate. One is a convergence characteristic in which the initial value of a short-term target bit rate is set higher than the target convergence bit rate so as to gradually adjust the average value to the target convergence bit rate in a predetermined period, as represented by L401 in FIG. 11A. Another one is a convergence characteristic in which the initial value of a short-term target bit rate is set lower than the target convergence bit rate so as to gradually adjust the average value to the target convergence bit rate in a predetermined period, as represented by L402 in FIG. 11B.

As represented by L401 in FIG. 11A, when the initial value of the short-term target bit rate is set higher than the target convergence bit rate, the amount of codes to be assigned to pictures immediately after the start of encoding increases. This makes it possible to obtain an image with good quality. In this case, however, when an image with a complex pattern or an image with a large motion magnitude is suddenly input, a sufficient amount of codes cannot probably be given to that image owing to a high buffer occupation ratio, resulting in a deterioration in image quality.

As represented by L402 in FIG. 11B, when the initial value of the short-term target bit rate is set lower than the target convergence bit rate, the amount of codes to be assigned to pictures immediately after the start of encoding decreases. This makes it difficult to obtain an image with good quality. In this case, however, when an image with a complex pattern or an image with a large motion magnitude is suddenly input, a sufficient amount of codes can be given to that image owing to a low buffer occupation ratio. In this embodiment, such a convergence characteristic is changed in accordance with camera status information in the standby mode, as will be described later.

An operation for changing the convergence characteristic of an encoding bit rate in code amount control by the variable bit rate (VBR) scheme according to this embodiment will be described next with reference to FIG. 5.

A timing chart showing an example of short-term target bit rate initial value calculation in code amount control by the variable bit rate (VBR) scheme will be explained. The timing chart according to this embodiment is the same as that in the first embodiment shown in FIG. 5, and a description thereof will be done by citing FIG. 5.

a in FIG. 5 represents whether the camera unit 101 is set in an active state or sleep state, and b in FIG. 5 represents whether the encoding unit 102 is set in an active state or sleep state. The active state of the camera unit 101 indicates, e.g., a state in which the camera unit 101 so operates as to output an uncompressed video signal and camera status information. The active state of the encoding unit 102 indicates, e.g., a state in which the encoding processing unit 106 is allowed to execute the encoding process and to output encoded data.

The sleep state of the camera unit 101 or encoding unit 102 indicates the following state. That is, the camera unit 101 or encoding processing unit 106 does not operate because the camera unit 101 or encoding processing unit 106 is not powered on or a clock to be input to the camera unit 101 or encoding processing unit 106 is stopped.

When the camera unit 101 enters the sleep state, it does not output an uncompressed video signal and camera status information. When the encoding unit 102 enters the sleep state, it does not output encoded data but can record the initial value of an encoding parameter in the encoding parameter initial value storage unit 107.

After being powered on, most of image capturing apparatuses activate only the camera unit 101 but stop the encoding unit 102 until recording starts so as to reduce power consumption. A state in which the camera unit 101 and the encoding unit 102 are respectively set in the active state and sleep state, i.e., a state during the period from time t0 to time t1 or from time t3 to time t4 in FIG. 5 is called a standby mode. A state in which both the camera unit 101 and encoding unit 102 are set in the active state, i.e., a state during the period from time t1 to time t3 or after time t4 in FIG. 5 is called a recording mode.

c in FIG. 5 represents a state in which a recording switch 104 is pressed. The recording switch 104 is used to issue a recording start/end instruction. In this example, by pressing the recording switch 104 once at time t1, a shift from the standby mode to the recording mode is made to start recording. By pressing the recording switch 104 again at time t3, a shift from the recording mode to the standby mode is made to end recording. By pressing the recording switch 104 again at time t4, a shift from the standby mode to the recording mode is made to start recording.

d in FIG. 5 represents focus information as an example of camera status information acquired by the encoding parameter initial value calculation unit 103 from the camera unit 101. The focus information is obtained from a camera signal processing unit 204 and indicates the focus state. d in FIG. 5 expresses an in-focus state as "low" and a defocus state as "high". In this example, the focus is kept unadjusted during the period from time t0 to time t2. Therefore, an uncompressed video signal output from the camera unit 101 to the encoding unit 102 during the period from time t0 to time t2 represents a burred image. On the other hand, the focus is kept adjusted after time t2. Therefore, an uncompressed in-focus video signal is output from the camera unit 101 to the encoding unit 102 after time t2.

The encoding parameter initial value calculation unit 103 acquires camera status information at time t1 immediately before switching from the standby mode to the recording mode, i.e., corresponding to the moment when the photographer presses the recording switch 104. The encoding parameter initial value calculation unit 103 calculates the initial value of an encoding parameter at least once, and outputs and records it in the encoding parameter initial value storage unit 107. After that, the code amount control unit 313 controls the code amount in accordance with the initial value of that encoding parameter stored in the encoding parameter initial value storage unit 107.

In the example of FIG. 5, focus information which is represented by d and serves as camera status information at the moment when the photographer presses the recording switch 104 at time t1 indicates a defocus state. Accordingly, a blurred image is input to the encoding processing unit 106. A blurred image rarely attracts audience's attention at the time of image playback. Even if a small amount of codes are given to that image and thereby decrease a perceived resolution, deterioration in image quality is inconspicuous. In this case, the initial value of a short-term target bit rate is set lower than the target convergence bit rate. Focus information at the moment when the photographer presses the recording switch 104 at time t4 indicates an in-focus state. Accordingly, an in-focus image is input to the encoding processing unit 106. An in-focus image attracts a great deal of audience's attention at the time of image playback. A large amount of codes should be given to that image and thereby improve a perceived resolution. In this case, the initial value of a short-term target bit rate is set higher than the target convergence bit rate.

As described above, in case of a blurred image, the initial value of a short-term target bit rate is set lower than the target convergence bit rate, and the encoding bit rate is controlled to converge to the target converge bit rate as represented by, e.g., L402 in FIG. 11B. In case of an in-focus image, the initial value of a short-term target bit rate is set higher than the target convergence bit rate, and the encoding bit rate is controlled to converge to the target convergence bit rate as represented by, e.g., L401 in FIG. 11A.

In view of this, a short-term target bit rate is set low if the image immediately after the start of encoding is a blurred image which rarely attracts attention. This makes it possible to give a sufficient amount of codes even when an image with a complex pattern or an image with a large motion magnitude is suddenly input. Moreover, a short-term target bit rate is set high if the image immediately after the start of encoding is a blurred image which attracts a great deal of attention. This makes it possible to give a sufficient amount of codes to the image which receives a great deal of attention.

The camera status information may be camera shake information, zoom information, or pan/tilt information. Assume that the camera status information is the camera shake information. If a camera shake is generated the moment the photographer presses the recording switch 104, it acts to shake a video image, resulting in a decrease in degree of audience's attention. In this case, the initial value of a short-term target bit rate is set lower than the target convergence bit rate, and the encoding bit rate is controlled to converge to the target convergence bit rate as represented by, e.g., L402 in FIG. 11B.

If no camera shake is generated the moment the photographer presses the recording switch 104, a video image does not shake, resulting in an increase in degree of audience's attention. In this case, the initial value of a short-term target bit rate is set higher than the target convergence bit rate, and the encoding bit rate is controlled to converge to the target convergence bit rate as represented by, e.g., L401 in FIG. 11A.

Assume that the camera status information is zoom information or pan/tilt information. If a video image is being zoomed or panned/tilted the moment the photographer presses the recording switch 104, that video image is moving at high speed, resulting in a decrease in degree of audience's attention. In this case, the initial value of a short-term target bit rate is set lower than the target convergence bit rate, and the encoding bit rate is controlled to converge to the target convergence bit rate as represented by, e.g., L402 in FIG. 11B. If a video image is not being zoomed or panned/tilted the moment the photographer presses the recording switch 104, the degree of audience's attention increases. In this case, the initial value of a short-term target bit rate is set higher than the target convergence bit rate, and the encoding bit rate is controlled to converge to the target convergence bit rate as represented by, e.g., L401 in FIG. 11A.

Figure 12:
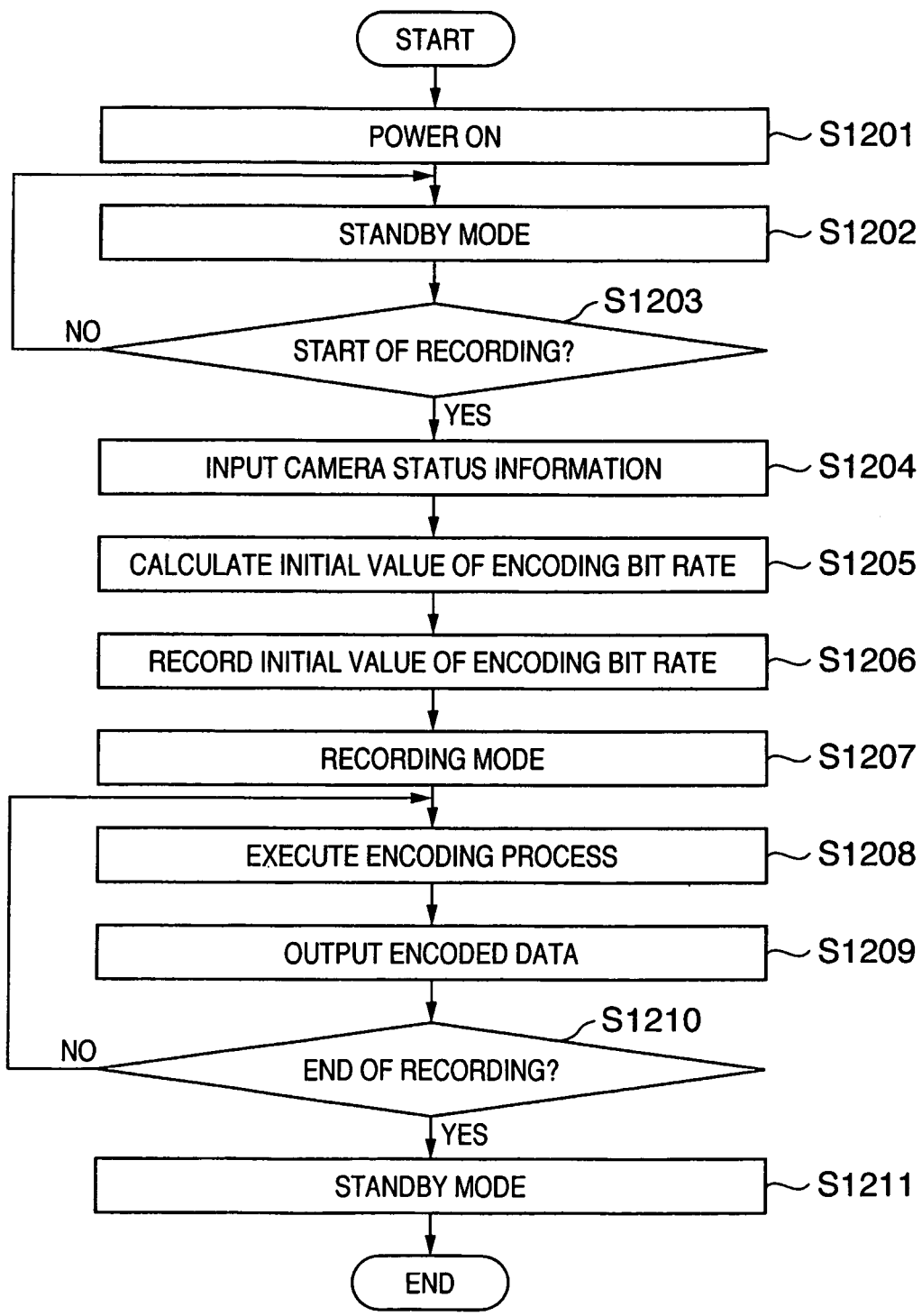
FIG. 12 is a flowchart showing an operation according to the fourth embodiment.
Figure 13:
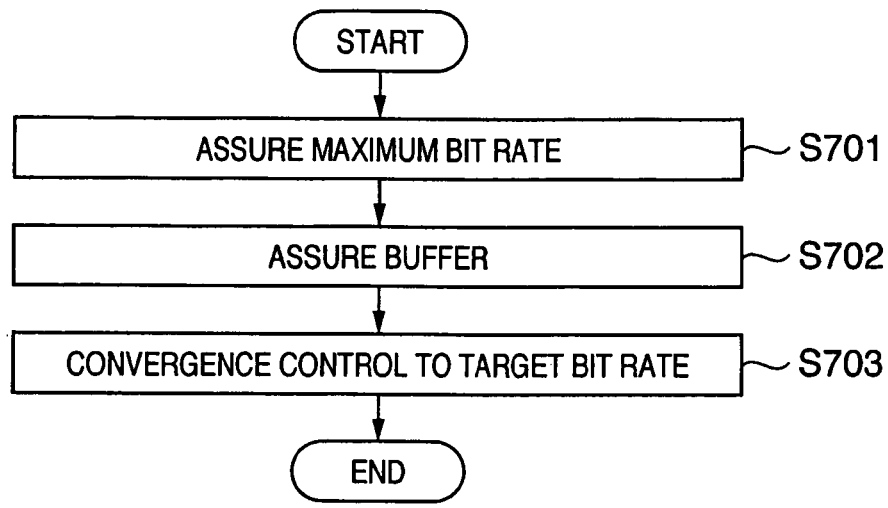
FIG. 13 is a flowchart showing variable bit rate (VBR) code amount control.

A process of calculating the initial value of a short-term target bit rate in accordance with camera status information according to this embodiment described above to control the code amount in accordance with the initial value of that short-term target bit rate will be described next with reference to the flowchart in FIG. 12.

In step S1201, the image capturing apparatus main body is powered on. Upon being powered on, the image capturing apparatus enters the standby mode in step S1202. The camera unit 101 and encoding unit 102 enter the active state and sleep state, respectively.

Through display devices such as a finder and liquid crystal monitor (not shown) accessory to the image capturing apparatus, the photographer executes operations such as determination of a composition desired to be photographed. Upon determining the composition desired to be photographed, the photographer presses the recording switch 104 of the image capturing apparatus in step S1203 to issue a recording start instruction.

Upon receiving the recording start instruction in step S1203, the encoding parameter initial value calculation unit 103 acquires camera status information from the camera unit 101 in step S1204. In step S1205, the encoding parameter initial value calculation unit 103 calculates the initial value of a short-term target bit rate by the above-described method in accordance with the camera status information acquired from the camera unit 101 in step S1204. In step S1206, the encoding parameter initial value calculation unit 103 outputs and records the calculated initial value in the encoding parameter initial value storage unit 107.

When the initial value of the short-term target bit rate is recorded, a shift to the recording mode is made in step S1207 to cause the camera unit 101 and the encoding unit 102 to enter the active state. In step S1208, the encoding processing unit 106 executes the encoding process. At this time, the code amount control unit 313 reads the initial value of the short-term target bit rate which is recorded in the encoding parameter initial value storage unit 107 in step S1206. The code amount control unit 313 controls the code amount by the above-described method in accordance with the initial value of the short-term target bit rate.

In step S1209, encoded data is output. This encoding process is executed until the photographer presses the recording switch 104 again to end recording in step S1210. If recording is determined to be ended in step S1210, the image capturing apparatus enters the standby mode in step S1211, thus ending recording.

As described above, according to the fourth embodiment, when a shift from a standby mode in which an encoding unit does not operate to a recording mode in which the encoding unit executes the encoding process is to be made, a code amount control unit reads a short-term target bit rate calculated in accordance with camera status information. This makes it possible to execute the encoding process while setting that short-term target bit rate as the initial value of a certain short-term target bit rate. Hence, unlike the prior arts, the initial value of an encoding parameter can be appropriately set without executing the encoding process in advance. This makes it possible to reduce power consumption and to improve the encoding efficiency.

Fifth Embodiment

FIG. 14 is a block diagram showing the arrangement of an image capturing apparatus which incorporates an image encoding device according to the fifth embodiment of the present invention. The same reference numerals as in the first embodiment shown in FIG. 1 denote the same function portions in FIG. 14.

Referring to FIG. 14, a camera unit 101 executes photography and outputs an uncompressed video signal and camera status information indicating its operations and processes. The camera status information is identical to that described in the first embodiment. An encoding unit 102 compresses and encodes the uncompressed video signal from the camera unit 101. A first encoding parameter initial value calculation unit 108 calculates the initial value of a first encoding parameter to be used in the encoding process immediately after encoding, in accordance with camera status information from the camera unit 101. A second encoding parameter initial value calculation unit 109 calculates the initial value of a second encoding parameter in accordance with the initial value of the first encoding parameter calculated by the first encoding parameter initial value calculation unit 108. A recording switch 104 is used to issue a recording start/end instruction. A control unit 105 controls the camera unit 101, encoding unit 102, first encoding parameter initial value calculation unit 108, second encoding parameter initial value calculation unit 109, and recording switch 104. The encoding unit 102 comprises an encoding processing unit 106 and encoding parameter initial value storage unit 107.

The arrangements and operations of the camera unit 101 and encoding unit 102 are the same as those described in the first embodiment with reference to FIGS. 1 to 3, and a description thereof will be omitted.

The first encoding parameter initial value calculation unit 108 will be explained with reference to FIGS. 5, 11A and 11B, and 14.

The first encoding parameter initial value calculation unit 108 in FIG. 14 receives camera status information from the camera unit 101 to calculate the initial value of an encoding parameter. As a practical example of encoding parameter initial value calculation, the initial value of a short-term target bit rate in code amount control by the variable bit rate (VBR) scheme will be described.

The encoding bit rate in code amount control by the variable bit rate (VBR) scheme will be explained with reference to FIGS. 11A and 11B.

FIGS. 11A and 11B are graphs showing the encoding bit rate control states. L401 and L402 represent changes in encoding bit rate per unit time and gradually converge to a target convergence bit rate BR in a convergence time T.

As described above, in code amount control by the variable bit rate (VBR) scheme, for example, a short-term target encoding bit rate is set for each picture. The VBR scheme averages actual encoding bit rates obtained as a result of encoding, and performs optimal code amount distribution in accordance with the complexity and motion magnitude of a moving image in each frame even while approximating the average value to a long-term target convergence bit rate.

There are two convergence characteristics in which the average value of actual encoding bit rates obtained as a result of encoding is allowed to converge to the target convergence bit rate.

One is a convergence characteristic in which the initial value of a short-term target bit rate is set higher than the target convergence bit rate so as to gradually adjust the average value to the target convergence bit rate in a predetermined period, as represented by L401 in FIG. 11A. Another one is a convergence characteristic in which the initial value of a short-term target bit rate is set lower than the target convergence bit rate so as to gradually adjust the average value to the target convergence bit rate in a predetermined period, as represented by L402 in FIG. 11B.

As represented by L401 in FIG. 11A, when the initial value of the short-term target bit rate is set higher than the target convergence bit rate, the amount of codes to be assigned to pictures immediately after the start of encoding increases. This makes it possible to obtain an image with good quality. In this case, however, when an image with a complex pattern or an image with a large motion magnitude is suddenly input, a sufficient amount of codes cannot probably be given to that image owing to a high buffer occupation ratio, resulting in a deterioration in image quality.

As represented by L402 in FIG. 11B, when the initial value of the short-term target bit rate is set lower than the target convergence bit rate, the amount of codes to be assigned to pictures immediately after the start of encoding decreases. This makes it difficult to obtain an image with good quality. In this case, however, when an image with a complex pattern or an image with a large motion magnitude is suddenly input, a sufficient amount of codes can be given to that image owing to a low buffer occupation ratio.

An operation for changing the convergence characteristic of the encoding bit rate in code amount control by the variable bit rate (VBR) scheme according to this embodiment will be described next with reference to FIG. 5.

FIG. 5 is a timing chart showing an example of short-term target bit rate initial value calculation in code amount control by the variable bit rate (VBR) scheme. a in FIG. 5 represents whether the camera unit 101 is set in an active state or sleep state, and b in FIG. 5 represents whether the encoding unit 102 is set in an active state or sleep state.

The active state of the camera unit 101 indicates, e.g., a state in which the camera unit 101 so operates as to output an uncompressed video signal and camera status information. The active state of the encoding unit 102 indicates, e.g., a state in which the encoding processing unit 106 is allowed to execute the encoding process and to output encoded data. The sleep state of the camera unit 101 or encoding unit 102 indicates, e.g., the following state. That is, the camera unit 101 or encoding processing unit 106 does not operate because the camera unit 101 or encoding processing unit 106 is not powered on or a clock to be input to the camera unit 101 or encoding processing unit 106 is stopped.

When the camera unit 101 enters the sleep state, it does not output an uncompressed video signal and camera status information. When the encoding unit 102 enters the sleep state, it does not output encoded data but can record the initial value of an encoding parameter in the encoding parameter initial value storage unit 107.

After being powered on, most of image capturing apparatuses activate only the camera unit 101 but stop the encoding unit 102 until recording starts so as to reduce power consumption.

A state in which the camera unit 101 and the encoding unit 102 are respectively set in the active state and sleep state, i.e., a state during the period from time t0 to time t1 or from time t3 to time t4 in FIG. 5 is called a standby mode.

A state in which both the camera unit 101 and encoding unit 102 are set in the active state, i.e., a state during the period from time t1 to time t3 or after time t4 in FIG. 5 is called a recording mode.

c in FIG. 5 represents a state in which the recording switch 104 is pressed. The recording switch 104 is used to issue a recording start/end instruction. In this example, by pressing the recording switch 104 once at time t1, a shift from the standby mode to the recording mode is made to start recording. By pressing the recording switch 104 again at time t3, a shift from the recording mode to the standby mode is made to end recording. By pressing the recording switch 104 again at time t4, a shift from the standby mode to the recording mode is made to start recording.

d in FIG. 5 represents focus information as an example of camera status information input from the camera unit 101 to the first encoding parameter initial value calculation unit 108. The focus information is obtained from a camera signal processing unit 204 and indicates the focus state. d in FIG. 5 expresses an in-focus state as "low" and a defocus state as "high". In this example, the focus is kept unadjusted during the period from time t0 to time t2. Therefore, an uncompressed video signal output from the camera unit 101 to the encoding unit 102 during the period from time t0 to time t2 represents a burred image. On the other hand, the focus is kept adjusted after time t2. Therefore, an uncompressed in-focus video signal is output from the camera unit 101 to the encoding unit 102 after time t2.

The first encoding parameter initial value calculation unit 108 acquires camera status information at time t1 immediately before switching from the standby mode to the recording mode, i.e., corresponding to the moment when the photographer presses the recording switch 104. The encoding parameter initial value calculation unit 103 calculates the initial value of a first encoding parameter at least once, and outputs it to the second encoding parameter initial value calculation unit 109 and encoding parameter initial value storage unit 107. The initial value of the first encoding parameter is recorded in the encoding parameter initial value storage unit 107 together with the initial value of the second encoding parameter calculated by the second encoding parameter initial value calculation unit 109 (to be described later). After that, the code amount control unit 313 controls the code amount in accordance with the initial values of the first and second encoding parameters stored in the encoding parameter initial value storage unit 107.

In the example of FIG. 5, focus information which is represented by d and serves as camera status information at the moment when the photographer presses the recording switch 104 at time t1 indicates a defocus state. Accordingly, a blurred image is input td the encoding processing unit 106. The blurred image rarely attracts audience's attention at the time of image playback. Even if a small amount of codes are given to that image and thereby decrease a perceived resolution, deterioration in image quality is inconspicuous. In this case, the initial value of a short-term target bit rate is set lower than the target convergence bit rate.

Focus information at the moment when the photographer presses the recording switch 104 at time t4 indicates an in-focus state. Accordingly, an in-focus image is input to the encoding processing unit 106. The in-focus image attracts a great deal of audience's attention at the time of image playback. A large amount of codes should be given to that image and thereby improve a perceived resolution. In this case, the initial value of a short-term target bit rate is set higher than the target convergence bit rate.

As described above, in case of a blurred image, the initial value of a short-term target bit rate is set lower than the target convergence bit rate. If the target convergence time is assumed to be a standard target convergence time T, the encoding bit rate is controlled to converge to the target converge bit rate as represented by, e.g., L402 in FIG. 11B.

In case of an in-focus image, the initial value of a short-term target bit rate is set higher than the target convergence bit rate. If the target convergence time is assumed to be the standard target convergence time T, the encoding bit rate is controlled to converge to the target convergence bit rate as represented by, e.g., L401 in FIG. 11A.

In view of this, a short-term target bit rate is set low if the image immediately after the start of encoding is a blurred image which rarely attracts attention. This makes it possible to give a sufficient amount of codes even when an image with a complex pattern or an image with a large motion magnitude is suddenly input. Moreover, a short-term target bit rate is set high if the image immediately after the start of encoding is a blurred image which attracts a great deal of attention. This makes it possible to give a sufficient amount of codes to the image which receives a great deal of attention.

The camera status information may be camera shake information, zoom information, or pan/tilt information. Assume that the camera status information is the camera shake information. If a camera shake is generated the moment the photographer presses the recording switch 104, it acts to shake a video image, resulting in a decrease in degree of audience's attention. In this case, the initial value of a short-term target bit rate is set lower than the target convergence bit rate. If the target convergence time is assumed to be the standard target convergence time T, the encoding bit rate is controlled to converge to the target convergence bit rate as represented by, e.g., L402 in FIG. 11B. If no camera shake is generated the moment the photographer presses the recording switch 104, a video image does not shake, resulting in an increase in degree of audience's attention. In this case, the initial value of a short-term target bit rate is set higher than the target convergence bit rate, and the encoding bit rate is controlled to converge to the target convergence bit rate as represented by, e.g., L401 in FIG. 11A.

Assume that the camera status information is zoom information or pan/tilt information. If a video image is being zoomed or panned/tilted the moment the photographer presses the recording switch 104, that video image is moving at high speed, resulting in a decrease in degree of audience's attention. In this case, the initial value of a short-term target bit rate is set lower than the target convergence bit rate. If the target convergence time is assumed to be the standard target convergence time T, the encoding bit rate is controlled to converge to the target convergence bit rate as represented by, e.g., L402 in FIG. 11B. If a video image is not being zoomed or panned/tilted the moment the photographer presses the recording switch 104, the degree of audience's attention increases. In this case, the initial value of a short-term target bit rate is set higher than the target convergence bit rate. If the target convergence time is assumed to be the standard target convergence time T, the encoding bit rate is controlled to converge to the target convergence bit rate as represented by, e.g., L401 in FIG. 11A.

The above description is related to the operation for calculating the initial value of a short-term target bit rate in accordance with camera status information to control the code amount in accordance with the initial value of that encoding parameter.

The second encoding parameter initial value calculation unit 109 as a characteristic feature of this embodiment will be described in detail below.

The initial values of the short-term target bit rate and target convergence time will be exemplified here as the initial values of the first and second encoding parameters, respectively. A method of causing the second encoding parameter initial value calculation unit 109 to change the initial value of a target convergence time in accordance with the initial value of a short-term target bit rate set in the first encoding parameter initial value calculation unit 108 by the above-described method will be explained.

The second encoding parameter initial value calculation unit 109 calculates the initial value of a target convergence time in accordance with the initial value of a short-term target bit rate which is calculated by the first encoding parameter initial value calculation unit 108 by the above-described method the moment the photographer presses the recording switch. The second encoding parameter initial value calculation unit 109 outputs the resultant value to the encoding parameter initial value storage unit 107 to record it together with the initial value of the short-term target bit rate. After that, in addition to the short-term target bit rate calculated by the first encoding parameter initial value calculation unit 108, a code amount control unit 313 controls the code amount while setting, as the initial value of an encoding parameter, the target convergence time calculated by the second encoding parameter initial value calculation unit 109.

The timing at which the second encoding parameter initial value calculation unit 109 calculates the initial value of a target convergence time is the same as that of the first encoding parameter initial value calculation unit 108, which has been described above, and a description thereof will be omitted.

This embodiment attempts to adaptively change a target convergence time in correspondence with a human visual characteristic in which he/she can readily perceive a gradual degradation in video image quality than a gradual improvement in video image quality. This change will be concretely described below with reference to FIGS. 11A and 11B and 15A and 15B. As described above, the convergence characteristic of an encoding bit rate in code amount control by the variable bit rate (VBR) scheme changes depending on the initial value of a short-term target bit rate calculated by the first encoding parameter initial value calculation unit 108 in accordance with camera status information. There are two convergence characteristics involved. One is a convergence characteristic in which the initial value of a short-term target bit rate is set higher than the target convergence bit rate so as to gradually adjust the average value to the target convergence bit rate, as represented by L401 in FIG. 11A. Another one is a convergence characteristic in which the initial value of a short-term target bit rate is set lower than the target convergence bit rate so as to gradually adjust the average value to the target convergence bit rate, as represented by L402 in FIG. 11B.

Figure 15B:
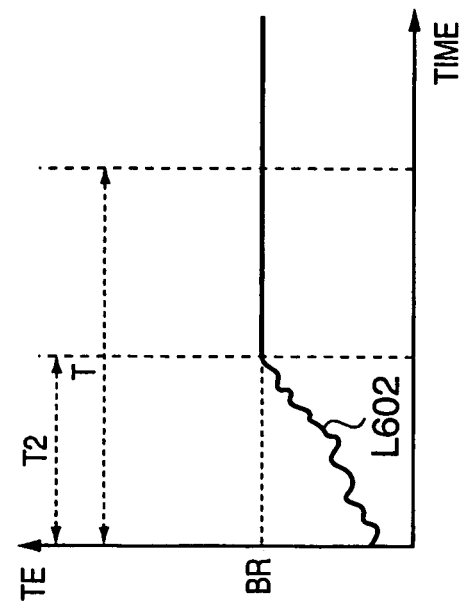
FIGS. 15A and 15B are graphs showing the convergence characteristics of encoding bit rates which converge in different times.
Figure 15A:
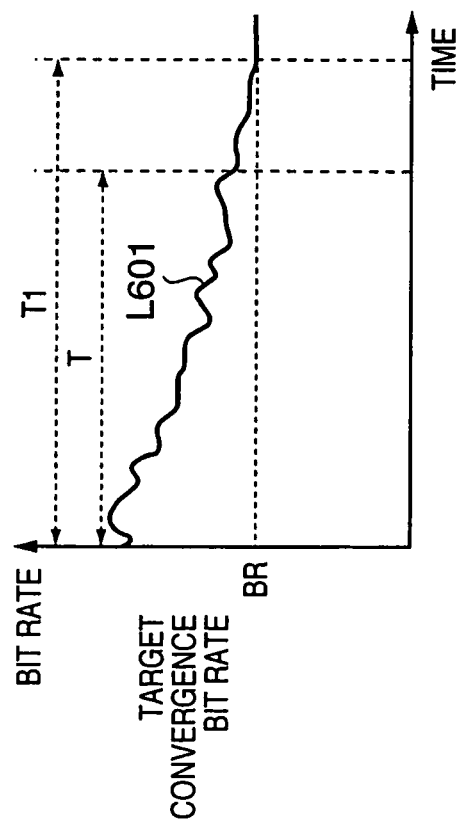

In case of the convergence characteristic as represented by L401 in FIG. 11A, the image quality is supposed to gradually degrade because an encoding bit rate gradually decreases. In case of the convergence characteristic as represented by L402 in FIG. 11B, the image quality is supposed to gradually improve because an encoding bit rate gradually increases. Accordingly, if the initial value of a short-term target bit rate is set higher than a target convergence bit rate by the first encoding parameter initial value calculation unit 108, the second encoding parameter initial value calculation unit 109 executes the following operation. That is, the second encoding parameter initial value calculation unit 109 sets a target convergence time T1 longer than the standard target convergence time T, as shown in FIG. 15A. If the initial value of a short-term target bit rate is set lower than a target convergence bit rate, the second encoding parameter initial value calculation unit 109 sets a target convergence time T2 shorter than the standard target convergence time T, as shown in FIG. 15B. In other words, the target convergence times T1 and T2 satisfy T1>T2.

With this operation, in view of the above-described human visual characteristic, even when the initial value of a short-term target bit rate is set higher than a target convergence bit rate, the target convergence time T1 is long enough to gradually decrease an encoding bit rate. For this reason, a deterioration in image quality becomes inconspicuous.

A process of controlling the code amount in accordance with the initial values of a short-term target bit rate and target convergence time which are calculated in accordance with camera status information and the initial value of that short-term target bit rate, respectively, according to this embodiment described above will be explained next with reference to the flowchart in FIG. 16.

In step S1701, the image capturing apparatus main body is powered on.

Upon being powered on, the image capturing apparatus enters the standby mode in step S1702. The camera unit 101 and encoding unit 102 enter the active state and sleep state, respectively.

Through display devices such as a finder and liquid crystal monitor (not shown) accessory to the image capturing apparatus, the photographer executes operations such as determination of a composition desired to be photographed.

Upon determining the composition desired to be photographed, the photographer presses the recording switch 104 of the image capturing apparatus in step S1703 to start recording.

When recording starts in step S1703, the first encoding parameter initial value calculation unit 108 acquires camera status information from the camera unit 101 in step S1704.

In step S1705, the first encoding parameter initial value calculation unit 108 calculates the initial value of a short-term target bit rate by the above-described method in accordance with the camera status information acquired from the camera unit 101 in step S1704.

If the initial value of the short-term target bit rate calculated in step S1705 is determined in step S1706 to be higher than a target convergence bit rate, the flow advances to step S1707.

In step S1707, the initial value of a target convergence time in code amount control by the variable bit rate (VBR) scheme is set longer than a standard target convergence time.

If the initial value of the short-term target bit rate calculated in step S1705 is determined in step S1706 to be lower than the target convergence bit rate, the flow advances to step S1708.

In step S1708, the initial value of the target convergence time in code amount control by the variable bit rate (VBR) scheme is set shorter than the standard target convergence time.

In step S1709, the initial value of the short-term target bit rate calculated in step S1705 and the initial value of the target convergence time calculated in step S1707 or step S1708 are output and recorded in the encoding parameter initial value storage unit 107.

When the initial values of the short-term target bit rate and target convergence time are recorded, a shift to the recording mode is made in step S1710 to cause the camera unit 101 and encoding unit 102 to enter the active state.

In step S1711, the encoding processing unit 106 executes the encoding process. At this time, the code amount control unit 313 reads the initial values of the short-term target bit rate and target convergence time which are recorded in the encoding parameter initial value storage unit 107 in step S1709. The code amount control unit 313 controls the code amount by the above-described method in accordance with the initial values of the short-term target bit rate and target convergence time.

In step S1712, encoded data is output.

This encoding process is executed until the photographer presses the recording switch 104 again to end recording in step S1713.

If recording is determined to be ended in step S1713, the image capturing apparatus enters the standby mode in step S1714, thus ending recording.

As described above, according to this embodiment, when a shift from a standby mode in which the operation of an encoding unit is restricted to a recording mode in which the encoding unit executes the encoding process is to be made, a convergence time in code amount control is changed in accordance with the initial value of a short-term target bit rate. That is, a convergence time in code amount control by the variable bit rate (VBR) scheme is changed in accordance with the initial value of a short-term target bit rate calculated in accordance with camera status information. This makes it possible to execute code amount control suitable for an input image and the human visual characteristic. Hence, unlike the prior arts, the initial value of an encoding parameter can be appropriately set without executing the encoding process in advance. This makes it possible to reduce power consumption and to improve the encoding efficiency.

Other Embodiment

The object of each embodiment is achieved even by the following method. That is, a storage medium (or recording medium) which records software program codes for implementing the functions of the above-described embodiments is supplied to the system or apparatus. The computer (or CPU or MPU) of the system or apparatus reads out and executes the program codes stored in the storage medium. In this case, the program codes read out from the storage medium implement the functions of the above-described embodiments by themselves, and the storage medium which stores the program codes constitutes the present invention. The functions of the above-described embodiments are implemented when the readout program codes are executed by the computer. Additionally, the present invention incorporates the following case. That is, the functions of the above-described embodiments are implemented when the operating system (OS) running on the computer performs part or all of actual processing on the basis of the instructions of the program codes.

The present invention also incorporates the following case. That is, the program codes read out from the storage medium are written in the memory of a function expansion card inserted into the computer or a function expansion unit connected to the computer. After that, the functions of the above-described embodiments are implemented when the CPU of the function expansion card or function expansion unit performs part or all of actual processing on the basis of the instructions of the program codes.

When the present invention is applied to the storage medium, it stores program codes corresponding to the above-described procedures.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-236733, filed Aug. 17, 2005, 2006-177293, filed Jun. 27, 2006, which are hereby incorporated by reference herein in their entirety.

What is claimed is:
1. An image capturing apparatus comprising:
a processor coupled to a memory cooperating to function as:

a camera unit which photo-electrically converts object light and outputs a video signal;

an encoding unit which encodes the video signal;

a code amount control unit which controls a bit rate of codes generated by said encoding unit according to a variable bit rate encoding scheme;

a camera information acquisition unit which acquires information associated with an operation status of said camera unit; and a calculation unit which calculates an initial parameter serving as an encoding parameter for said encoding unit, wherein the calculation unit calculates the initial parameter to set an initial target value of a variable bit rate according to the information acquired by said camera information acquisition unit, wherein the initial parameter is variable, and wherein the code amount control unit approximates the bit rate from the initial target value to a target convergence bit rate in a predetermined period.

2. The apparatus according to claim 1, wherein said calculation unit calculates the initial parameter at every predetermined time interval during a period from when said camera unit starts operation until said encoding unit starts an encoding operation.

3. The apparatus according to claim 1, further comprising a storage unit which stores the initial parameter calculated by said calculation unit, wherein said encoding unit reads out the initial parameter from said storage unit to encode the video signal.

4. The apparatus according to claim 1, wherein said camera information acquisition unit comprises a filter processing unit which executes a filter process for the information associated with the operation status of said camera unit.

5. The apparatus according to claim 4, wherein the filter process executed by said filter processing unit includes a smoothing filter process.

6. The apparatus according to claim 1, wherein the information acquired by said camera information acquisition unit contains at least one of focus information, camera shake information, zoom information, and pan/tilt information of said camera unit.

7. The apparatus according to claim 1, wherein the initial target value of the variable bit rate includes a short-term target bit rate in the variable bit rate encoding scheme.

8. The apparatus according to claim 7, wherein said code amount control unit can execute a first code amount control operation for setting the short-term target bit rate lower than the target convergence bit rate to make the short-term target bit rate gradually converge to the target convergence bit rate over a predetermined period, and a second code amount control operation for setting the short-term target bit rate higher than the target convergence bit rate to make the short-term target bit rate gradually converge to the target convergence bit rate over a predetermined period, and said calculation unit calculates whether to set the short-term target bit rate serving as the initial parameter higher or lower than the target convergence bit rate.

9. The apparatus according to claim 8, wherein if the information acquired by said camera information acquisition unit corresponds to at least one of defocus, camera shake, zoom in progress, and pan or tilt in progress of said camera unit, said calculation unit calculates the short-term target bit rate serving as the initial parameter, such that the short-term target bit rate has a value lower than the target convergence bit rate.

10. The apparatus according to claim 8, wherein said calculation unit comprises a first calculation unit which calculates the short-term target bit rate and a second calculation unit which calculates a convergence time during which the short-term target bit rate converges to the target convergence bit rate, and said second calculation unit sets the convergence time in accordance with the short-term target bit rate set by said first calculation unit.

11. The apparatus according to claim 10, wherein said second calculation unit sets the convergence time shorter than a standard convergence time if said first calculation unit sets the short-term target bit rate lower than the target convergence bit rate, and said second calculation unit sets the convergence time longer than the standard convergence time if said first calculation unit sets the short-term target bit rate higher than the target convergence bit rate.

12. A method of controlling an image capturing apparatus which comprises a camera unit which photo-electrically converts object light and outputs a video signal, and an encoding unit which encodes the video signal, the method comprising:

a code amount control step of controlling a bit rate of codes generated by said encoding unit according to a variable bit rate encoding scheme;

a camera information acquisition step of acquiring information associated with an operation status of the camera unit; and a calculation step of calculating an initial parameter serving as an encoding parameter for the encoding unit, wherein the calculation step calculates the initial parameter to set an initial target value of a variable bit rate according to the information acquired by said camera information acquisition step, wherein the initial parameter is variable, and wherein the code amount control step approximates the bit rate from the initial target value to a target convergence bit rate in a predetermined period.

13. The method according to claim 12, wherein in the calculation step, the initial parameter is calculated at every predetermined time interval during a period from when the camera unit starts operation until the encoding unit starts an encoding operation.

14. The method according to claim 12, further comprising a storage step of storing the initial parameter calculated in the calculation step, wherein the encoding unit reads out the initial parameter stored in the storage step to encode the video signal.

15. The method according to claim 12, wherein the camera information acquisition step comprises a filter processing step of executing a filter process for the information associated with the operation status of the camera unit.

16. The method according to claim 15, wherein the filter process executed in the filter processing step includes a smoothing filter process.

17. The method according to claim 12, wherein the information acquired in the camera information acquisition step contains at least one of focus information, camera shake information, zoom information, and pan/tilt information of the camera unit.

18. The method according to claim 12, wherein the initial target value of the variable bit rate includes a short-term target bit rate in the variable bit rate encoding scheme.

19. The method according to claim 18, wherein the code amount control step can execute a first code amount control operation for setting the short-term target bit rate lower than a target convergence bit rate to make the short-term target bit rate gradually converge to the target convergence bit rate over a predetermined period, and a second code amount control operation for setting the short-term target bit rate higher than the target convergence bit rate to make the short-term target bit rate gradually converge to the target convergence bit rate over a predetermined period, and whether to set the short-term target bit rate serving as the initial parameter higher or lower than the target convergence bit rate is calculated in the calculation step.

20. The method according to claim 19, wherein if the information acquired in the camera information acquisition step corresponds to at least one of defocus, camera shake, zoom in progress, and pan or tilt in progress of the camera unit, the short-term target bit rate serving as the initial parameter is calculated such that the short-term target bit rate has a value lower than the target convergence bit rate.

21. The method according to claim 19, wherein the calculation step comprises a first calculation step of calculating the short-term target bit rate and a second calculation step of calculating a convergence time during which the short-term target bit rate converges to the target convergence bit rate, and the convergence time is set in the second calculation step in accordance with the short-term target bit rate set in the first calculation unit.

22. The method according to claim 21, wherein the convergence time is set shorter than a standard convergence time in the second calculation step if the short-term target bit rate is set lower than the target convergence bit rate in the first calculation step, and the convergence time is set longer than the standard convergence time in the second calculation step if the short-term target bit rate is set higher than the target convergence bit rate in the first calculation step.

23. A non-transitory computer-readable storage medium retrievably storing a computer-executable program that when executed by a computer controls the computer to execute a control method defined in claim 12.

* * * * *